United States Patent
Krenn

(10) Patent No.: US 12,066,081 B2
(45) Date of Patent: Aug. 20, 2024

(54) DUAL-CLUTCH TRANSMISSION

(71) Applicant: BRP-ROTAX GMBH & CO. KG, Gunskirchen (AT)

(72) Inventor: Stefan Krenn, Linz (AT)

(73) Assignee: BRP-ROTAX GMBH & CO. KG, Gunskirchen (AT)

(*) Notice: Subject to any disclaimer, the term of this patent is extended or adjusted under 35 U.S.C. 154(b) by 198 days.

(21) Appl. No.: 17/796,075

(22) PCT Filed: Feb. 1, 2021

(86) PCT No.: PCT/EP2021/052271
§ 371 (c)(1),
(2) Date: Jul. 28, 2022

(87) PCT Pub. No.: WO2021/152167
PCT Pub. Date: Aug. 5, 2021

(65) Prior Publication Data
US 2023/0258245 A1     Aug. 17, 2023

Related U.S. Application Data

(60) Provisional application No. 62/968,323, filed on Jan. 31, 2020.

(51) Int. Cl.
*F16H 3/00* (2006.01)
*B60K 17/344* (2006.01)
(Continued)

(52) U.S. Cl.
CPC .............. *F16H 3/006* (2013.01); *F16D 25/10* (2013.01); *F16H 57/0436* (2013.01);
(Continued)

(58) Field of Classification Search
CPC ...... F16H 3/006; F16H 57/0436; F16D 25/10; G60K 17/344
(Continued)

(56) References Cited

U.S. PATENT DOCUMENTS 3,040,408 A    6/1962 Shou
3,254,541 A    6/1966 Shou
(Continued)

FOREIGN PATENT DOCUMENTS

EP    2194243 A1    6/2010
GB    1431160 A     4/1976

OTHER PUBLICATIONS

International Search Report of PCT/EP2021/052271, Search Report completed on Mar. 31, 2021, Authorized Officer Martinez Hurtado, L., mailed on Apr. 12, 2021, 5 pages.
(Continued)

*Primary Examiner* — Ha Dinh Ho
(74) *Attorney, Agent, or Firm* — BCF LLP

(57) ABSTRACT

A dual-clutch transmission for use in a vehicle has a housing, a clutch pack drum adapted to rotate inside the housing, a central clutch gear connected to the clutch pack drum, a first clutch pack, a first clutch hub, a first pressure plate disposed on the first side of the central clutch gear, and a first shaft connected to the first clutch hub. The first shaft drives at least one first transmission gear when the first pressure plate squeezes the first clutch pack. The dual-clutch transmission further includes a second clutch pack, a second clutch hub, a second pressure plate disposed on the second side of the central clutch gear, and a second shaft connected to the second clutch hub. The second shaft drives at least one second transmission gear when the second pressure plate squeezes the second clutch pack. A vehicle having a dual-clutch transmission is also encompassed.

23 Claims, 16 Drawing Sheets

(51) Int. Cl.
  *F16D 25/10* (2006.01)
  *F16H 57/04* (2010.01)
(52) U.S. Cl.
  CPC .... *B60K 17/344* (2013.01); *F16H 2200/0078* (2013.01); *F16H 2200/0086* (2013.01)
(58) Field of Classification Search
  USPC .......................................................... 74/330
  See application file for complete search history.

(56) References Cited

U.S. PATENT DOCUMENTS

| | | | | |
|---|---|---|---|---|
| 3,791,500 A * | 2/1974 | Stefanutti | ............... | F16D 21/04 |
| | | | | 192/109 A |
| 4,570,503 A * | 2/1986 | Theobald | ................ | F16H 3/091 |
| | | | | 74/331 |
| 4,726,246 A * | 2/1988 | Whalen | ................... | F16H 3/093 |
| | | | | 74/357 |
| 5,188,575 A * | 2/1993 | Leising | .................... | F16H 3/66 |
| | | | | 192/85.33 |
| 6,910,399 B2 * | 6/2005 | Nishi | ...................... | F16H 3/089 |
| | | | | 74/376 |
| 7,278,523 B2 * | 10/2007 | Heinrich | ................. | F16D 25/10 |
| | | | | 192/112 |
| 10,047,805 B2 * | 8/2018 | Mitsubori | ............... | F16D 25/10 |
| 2014/0291106 A1 | 10/2014 | Mitsubori et al. | | |
| 2017/0167550 A1 | 6/2017 | Fujimoto et al. | | |

OTHER PUBLICATIONS

Written Opinion of the International Preliminary Examining Authority of PCT/EP2021/052271, Authorized Officer Martinez Hurtado, Mailed on Jan. 26, 2022, 13 pages.

\* cited by examiner

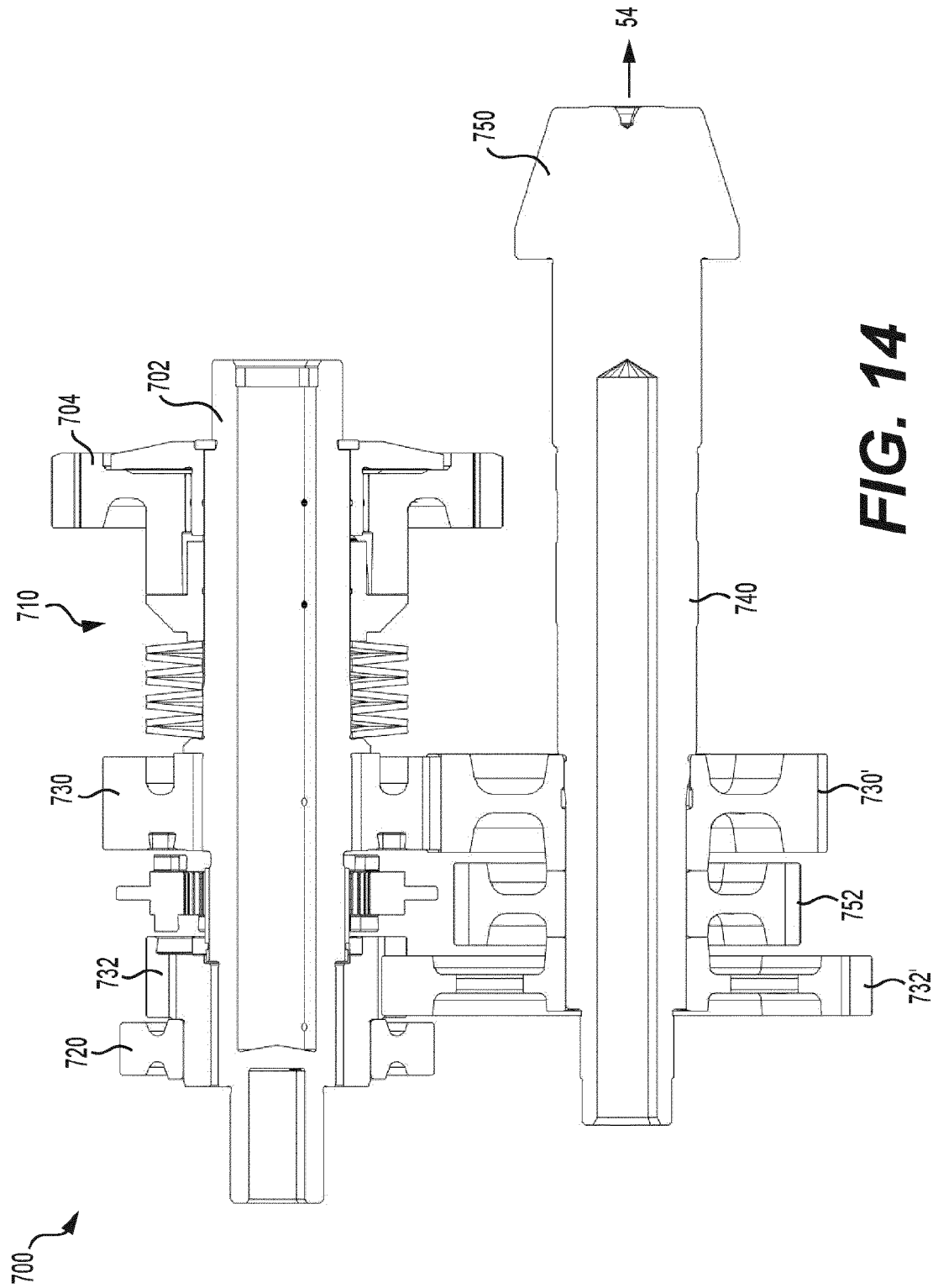

DUAL-CLUTCH TRANSMISSION

CROSS-REFERENCE TO RELATED APPLICATION

The present application claims priority to U.S. Provisional Patent Application Ser. No. 62/968,323, filed Jan. 31, 2020, entitled "Dual-Clutch Transmission", which is incorporated by reference herein in its entirety.

TECHNICAL FIELD

The present technology relates to dual-clutch transmissions.

BACKGROUND

Off-road vehicles have powertrains that can incorporate different types of transmission, such as a continuously variable transmission (CVT) or a manually operated transmission. However, other types of transmissions could be used in off-road vehicles and offer different performance in certain conditions than the aforementioned CVT and manually operated transmission.

A dual-clutch transmission (DCT) is a type of transmission that includes first and second clutches. The first clutch drives the odd-numbered transmission gears via a first shaft, and the second clutch drives the even-numbered transmission gears via a second shaft. In a DCT, gear changes can be accomplished without interrupting torque distribution to the driven wheels. The torque of the engine is applied to one clutch at the same time as it is being disconnected from the other clutch. Since alternate gear ratios can preselect an odd transmission gear on one shaft while the vehicle is being driven in an even transmission gear (and vice versa), DCTs offer good shifting performance and efficiency in certain conditions. However, dual-clutch transmissions have not been made widely available in off-road vehicles yet. Reasons causing the delay of their widespread adoption in off-road vehicles include relatively high manufacturing costs and packaging issues due to the limited space in the engine compartment.

Therefore, there is a desire for dual-clutch transmissions that can be efficiently packaged in an off-road vehicle, while having reduced manufacturing costs.

SUMMARY

It is an object of the present to ameliorate at least some of the inconveniences present in the prior art.

According to an aspect of the present technology, there is provided a dual-clutch transmission for use in a vehicle having an internal combustion engine and a driveline. The internal combustion engine has a crankshaft. The dual-clutch transmission includes a housing, a clutch pack drum adapted to rotate inside the housing, and a central clutch gear connected to the clutch pack drum and being operatively connected to the crankshaft of the internal combustion engine. The central clutch gear defines a clutch gear plane and a clutch gear rotation axis normal to the clutch gear plane. The dual-clutch transmission further includes a first clutch pack received in the clutch pack drum on a first side of the central clutch gear. The first clutch pack includes at least one first clutch plate engaging and rotating with the clutch pack drum, and at least one first clutch disk selectively engaged by the at least one first clutch plate, the at least one first clutch plate and the at least one first clutch disk being disposed alternatingly in a direction defined by the clutch gear rotation axis. The dual-clutch transmission further includes a first clutch hub received in the first clutch pack, the first clutch hub engaging and rotating with the at least one first clutch disk, a first pressure plate disposed on the first side of the central clutch gear, the first pressure plate rotating with the central clutch gear, the first pressure plate selectively squeezing the at least one first clutch plate and the at least one first clutch disk together for engaging the at least one first clutch disk with the at least one first clutch plate, a first shaft connected to the first clutch hub, and at least one first transmission gear operatively connected to the first shaft, the first shaft driving the at least one first transmission gear in response to the first pressure plate being moved axially to squeeze the at least one first clutch plate and the at least one first clutch disk together. The dual-clutch transmission further includes a second clutch pack received in the clutch pack drum on a second side of the central clutch gear. The second clutch pack includes at least one second clutch plate engaging and rotating with the clutch pack drum, and at least one second clutch disk selectively engaged by the at least one second clutch plate, the at least one second clutch plate and the at least one second clutch disk being disposed alternatingly in the direction defined by the clutch gear rotation axis. The dual-clutch transmission further includes a second clutch hub received in the second clutch pack, the second clutch hub engaging and rotating with the at least one second clutch disk a second pressure plate disposed on the second side of the central clutch gear, the second pressure plate rotating with the central clutch gear, the second pressure plate selectively squeezing the at least one second clutch plate and the at least one second clutch disk together for engaging the at least one second clutch disk with the at least one second clutch plate, a second shaft connected to the second clutch hub, and at least one second transmission gear operatively connected to the second shaft, the second shaft driving the at least one second transmission gear in response to the second pressure plate being moved axially to squeeze the at least one second clutch plate and the at least one second clutch disk together.

In some implementations, the first pressure plate is symmetrical to the second pressure plate about the clutch gear plane.

In some implementations, the first pressure plate is identical to the second pressure plate.

In some implementations, the dual-clutch transmission further includes an input damper operatively connected to the central clutch gear, the input damper being configured for operative connection to the crankshaft.

In some implementations, the input damper is located outside the clutch pack drum.

In some implementations, the input damper has a hollow shaft defining splines adapted for connection to the crankshaft, the hollow shaft having first and second ends, an input member slidably engaged to the hollow shaft and positioned between the first and second ends, the input member defining at least one recess, a disc spring assembly connected to the hollow shaft and biasing the input member towards the second end, an output member disposed over the hollow shaft and positioned between the input member and the second end of the hollow shaft, the output member defining at least one cam structured and configured for engaging the at least one recess of the input member, and an output gear connected to the output member, the output gear engaging and driving the central clutch gear.

In some implementations, the dual-clutch transmission further includes a pump gear operatively connected to the output member of the input damper, the pump gear being adapted to drive a transmission fluid pump.

In some implementations, the first shaft defines a first passage adapted for supplying fluid to a first chamber defined between the central clutch gear and the first pressure plate, and a second passage adapted for supplying fluid to a second chamber defined between the central clutch gear and the second pressure plate.

In some implementations, the first shaft further defines a third passage adapted for selectively supplying fluid to the clutch pack drum.

In some implementations, the first clutch hub has a plurality of bores defined therein adapted for supplying fluid from the third passage of the first shaft to the clutch pack drum.

In some implementations, each of the first and second pressure plates has a pressure plate passage defined therein for supplying fluid from the first shaft to the clutch pack drum.

In some implementations, the first and second pressure plates have a plurality of pads projecting therefrom and being configured to abut the central clutch gear, the pads being structured for selectively allowing flow of fluid from each of the first and second passages of the first shaft to the corresponding first and second chambers.

In some implementations, the clutch pack drum includes a first clutch pack basket disposed on the first side of the central clutch gear, and a second clutch pack basket disposed on the second side of the central clutch gear, the first clutch pack basket being symmetrical to the second clutch pack basket about the clutch gear plane.

In some implementations, the clutch pack drum includes a first clutch pack basket disposed on the first side of the central clutch gear, and a second clutch pack basket disposed on the second side of the central clutch gear, the first clutch pack basket being identical to the second clutch pack basket.

In some implementations, the dual-clutch transmission further includes a subtransmission having an input shaft being configured for operative connection to the first and second shafts, and an output shaft being configured for operative connection to the driveline of the vehicle, the subtransmission having a high gear configuration and a low gear configuration. When the subtransmission is in the high gear configuration, a first gear ratio is defined between the input shaft and the output shaft. When the subtransmission is in the low gear configuration, a second gear ratio is defined between the input shaft and the output shaft, the first gear ratio being smaller than the second gear ratio.

In some implementations, the subtransmission further includes an input gear, and an output damper operatively connected between the input gear and the input shaft of the subtransmission.

In some implementations, the second shaft is hollow and the first shaft extends through the second shaft.

In some implementations, the second shaft is operatively connected to the at least one second transmission gear on the second side of the central clutch gear, and the first shaft is operatively connected to the at least one first transmission gear on the second side of the central clutch gear.

In accordance with another aspect of the present technology, there is provided a vehicle having a frame, an engine connected to the frame, the dual-clutch transmission as described above operatively connected to the engine, and a driveline operatively connected to the dual-clutch transmission.

In accordance with another aspect of the present technology, there is provided a dual-clutch including a clutch pack drum, a central clutch gear connected to the clutch pack drum and being adapted for operative connection to a crankshaft, the central clutch gear defining a clutch gear plane and a clutch gear rotation axis normal to the clutch gear plane, a first clutch pack received in the clutch pack drum on a first side of the central clutch gear, the first clutch pack including at least one first clutch plate engaging and rotating with the clutch pack drum, and at least one first clutch disk selectively engaged by the at least one first clutch plate, the at least one first clutch plate and the at least one first clutch disk being disposed alternatingly in a direction defined by the clutch gear axis. The dual-clutch further has a first clutch hub received in the first clutch pack, the first clutch hub engaging and rotating with the at least one first clutch disk, and being configured for operative connection to a first shaft, a first pressure plate disposed on the first side of the central clutch gear, the first pressure plate rotating with the central clutch gear, the first pressure plate selectively squeezing the at least one first clutch plate and the at least one first clutch disk together for engaging the at least one first clutch disk with the at least one first clutch plate, a second clutch pack received in the clutch pack drum on a second side of the central clutch gear, the second clutch pack including at least one second clutch plate engaging and rotating with the clutch pack drum, and at least one second clutch disk selectively engaged by the at least one second clutch plate, the at least one second clutch plate and the at least one second clutch disk being disposed alternatingly in the direction defined by the clutch gear axis, a second clutch hub received in the second clutch pack, the second clutch hub engaging and rotating with the at least one second clutch disk, and being configured for operative connection to a second shaft, and a second pressure plate disposed on the second side of the central clutch gear, the second pressure plate rotating with the central clutch gear, the second pressure plate selectively squeezing the at least one second clutch plate and the at least one second clutch disk together for engaging the at least one second clutch disk with the at least one second clutch plate.

In some implementations, the first pressure plate is symmetrical to the second pressure plate about the clutch gear plane.

In some implementations, the first pressure plate is identical to the second pressure plate.

In some implementations, the first clutch hub has a plurality of bores defined therein adapted for supplying fluid to the clutch pack drum.

In some implementations, each of the first and second pressure plates has a pressure plate passage defined therein for supplying fluid to the clutch pack drum.

In some implementations, the first and second pressure plates have a plurality of pads projecting therefrom and being configured to abut the central clutch gear, the pads being structured for selectively allowing flow of fluid to the corresponding first and second chambers.

In some implementations, the clutch pack drum includes a first clutch pack basket disposed on the first side of the central clutch gear, and a second clutch pack basket disposed on the second side of the central clutch gear, the first clutch pack basket being symmetrical to the second clutch pack basket about the clutch gear plane.

In some implementations, the clutch pack drum includes a first clutch pack basket disposed on the first side of the central clutch gear, and a second clutch pack basket disposed on the second side of the central clutch gear, the first clutch pack basket being identical to the second clutch pack basket.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 14 is a longitudinal cross-sectional view of a subtransmission of the dual-clutch transmission of FIG. 3.

DETAILED DESCRIPTION

Figure 1:
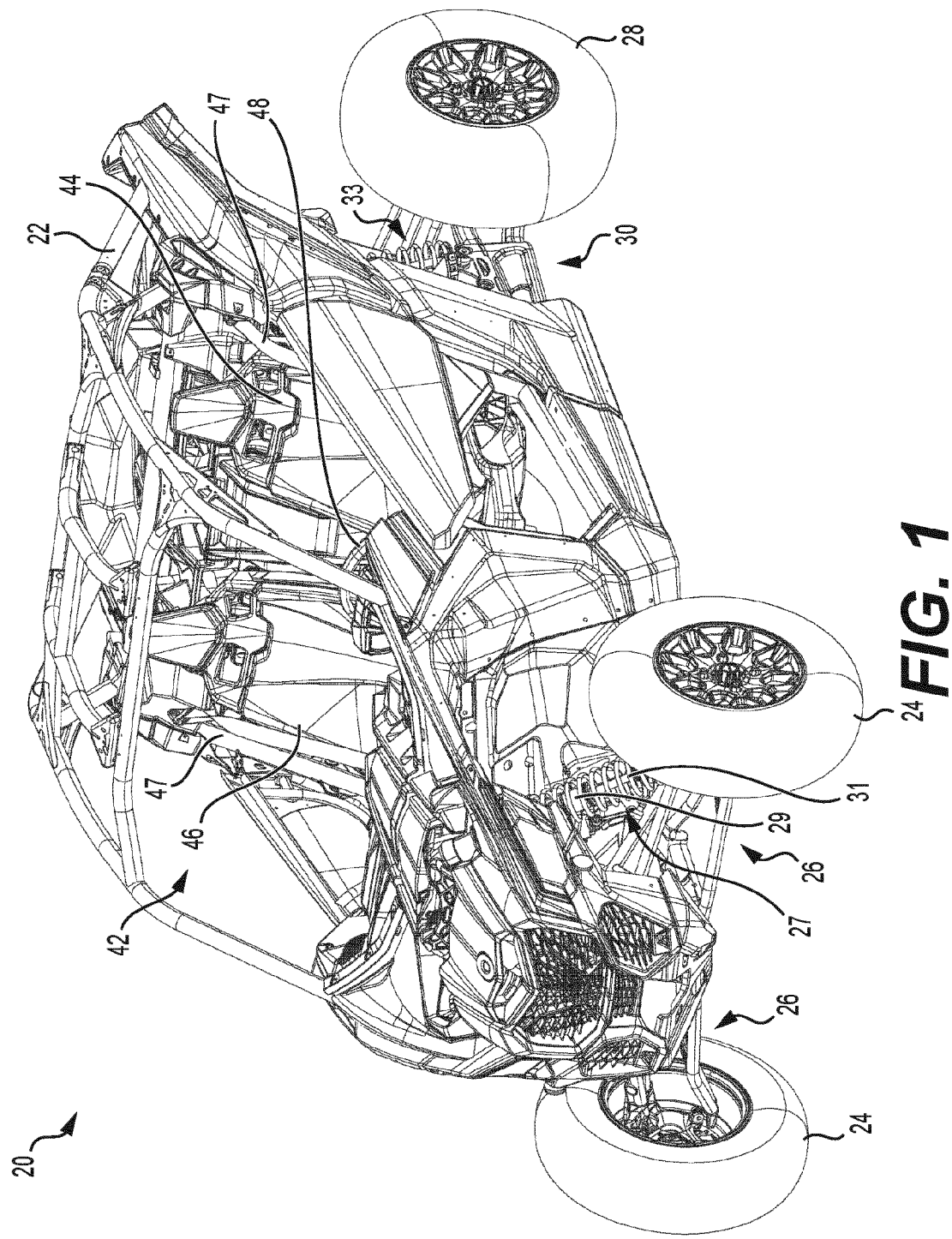
FIG. 1 is a perspective view taken from a top, front, left side of an off-road vehicle.

A dual-clutch transmission 100 (DCT) will be described herein with respect to a four-wheel side-by-side off-road vehicle 20, but it is contemplated that the DCT 100 could be used in other types of vehicles such as, but not limited to, off-road vehicles having more or less than four wheels and/or more or less than two seats. The general features of the off-road vehicle 20 will be described with respect to FIGS. 1 and 2.

The vehicle 20 has a frame 22, two front wheels 24 connected to a front of the frame 22 by front suspension assemblies 26 and two rear wheels 28 connected to the frame 22 by rear suspension assemblies 30 such as those described in U.S. Pat. No. 9,981,519 B2, dated May 29, 2018. Each front suspension assembly 26 has a front shock absorber assembly 27 including a shock absorber 29 and a spring 31. Each rear suspension assembly 30 has a rear shock absorber assembly 33 including a shock absorber 35 and a spring 37. Ground engaging members other than wheels 24, 28 are contemplated for the vehicle 20, such as tracks or skis. In addition, although four ground engaging members are illustrated in the Figures, the vehicle 20 could include more or less than four ground engaging members. Furthermore, different combinations of ground engaging members, such as tracks used in combination with skis, are contemplated.

The frame 22 defines a central cockpit area 42 inside which are disposed a driver seat 44 and a passenger seat 46. In the present implementation, the driver seat 44 is disposed on the left side of the vehicle 20 and the passenger seat 46 is disposed on the right side of the vehicle 20. However, it is contemplated that the driver seat 44 could be disposed on the right side of the vehicle 20 and that the passenger seat 46 could be disposed on the left side of the vehicle 20. As can be seen in FIG. 1, the vehicle 20 further has a seat belt 47 for each one of the seats 44, 46. A steering wheel 48 is disposed in front of the driver seat 44. The steering wheel 48 is used to turn the front wheels 24 to steer the vehicle 20. Various displays and gauges 50 are disposed in front of the steering wheel 48 to provide information to the driver regarding the operating conditions of the vehicle 20. Examples of displays and gauges 50 include, but are not limited to, a speedometer, a tachometer, a fuel gauge, a transmission position display, and an oil temperature gauge.

Figure 2:
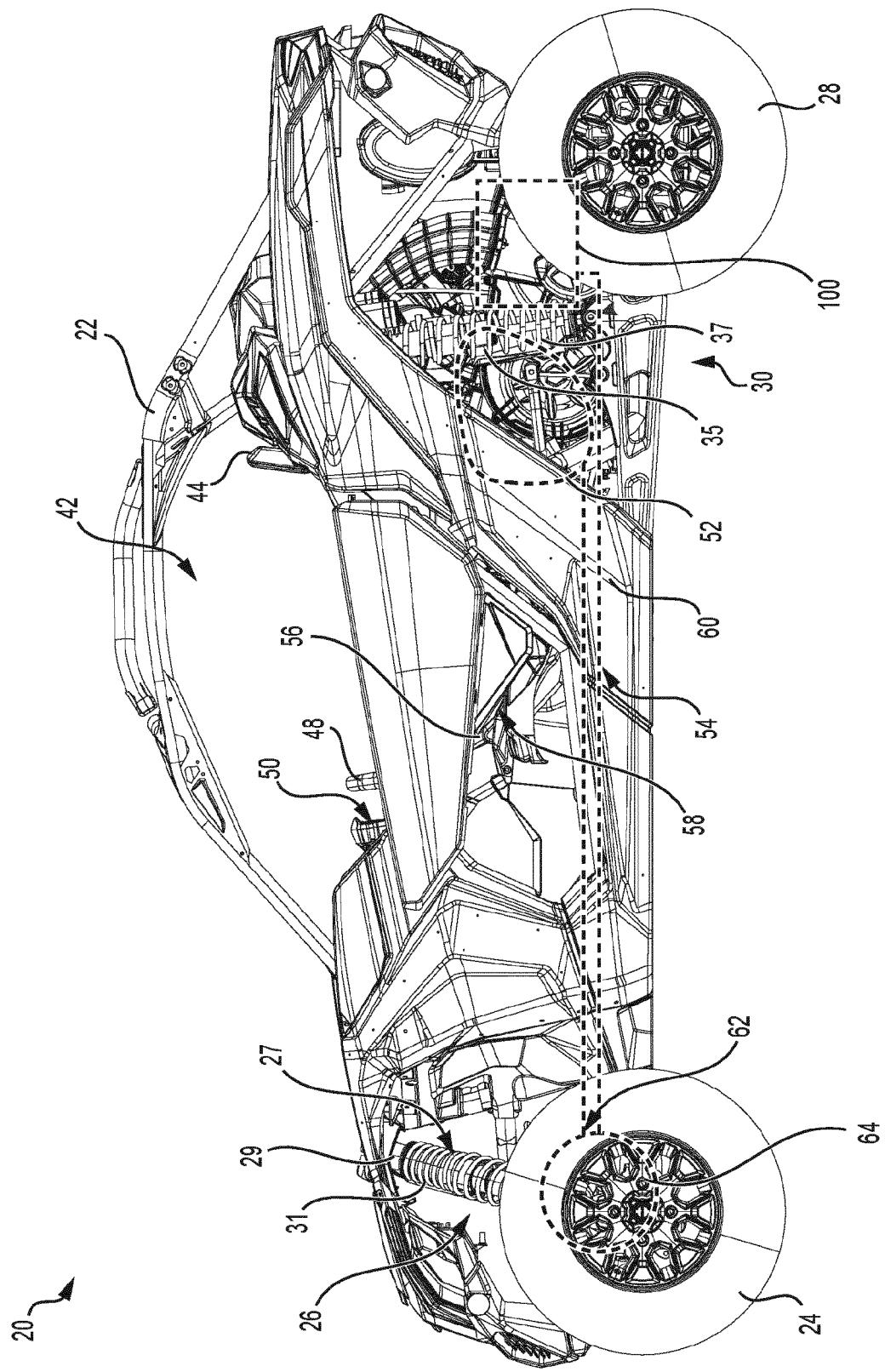
FIG. 2 is a left side elevation view of the off-road vehicle of FIG. 1.
Figure 3:
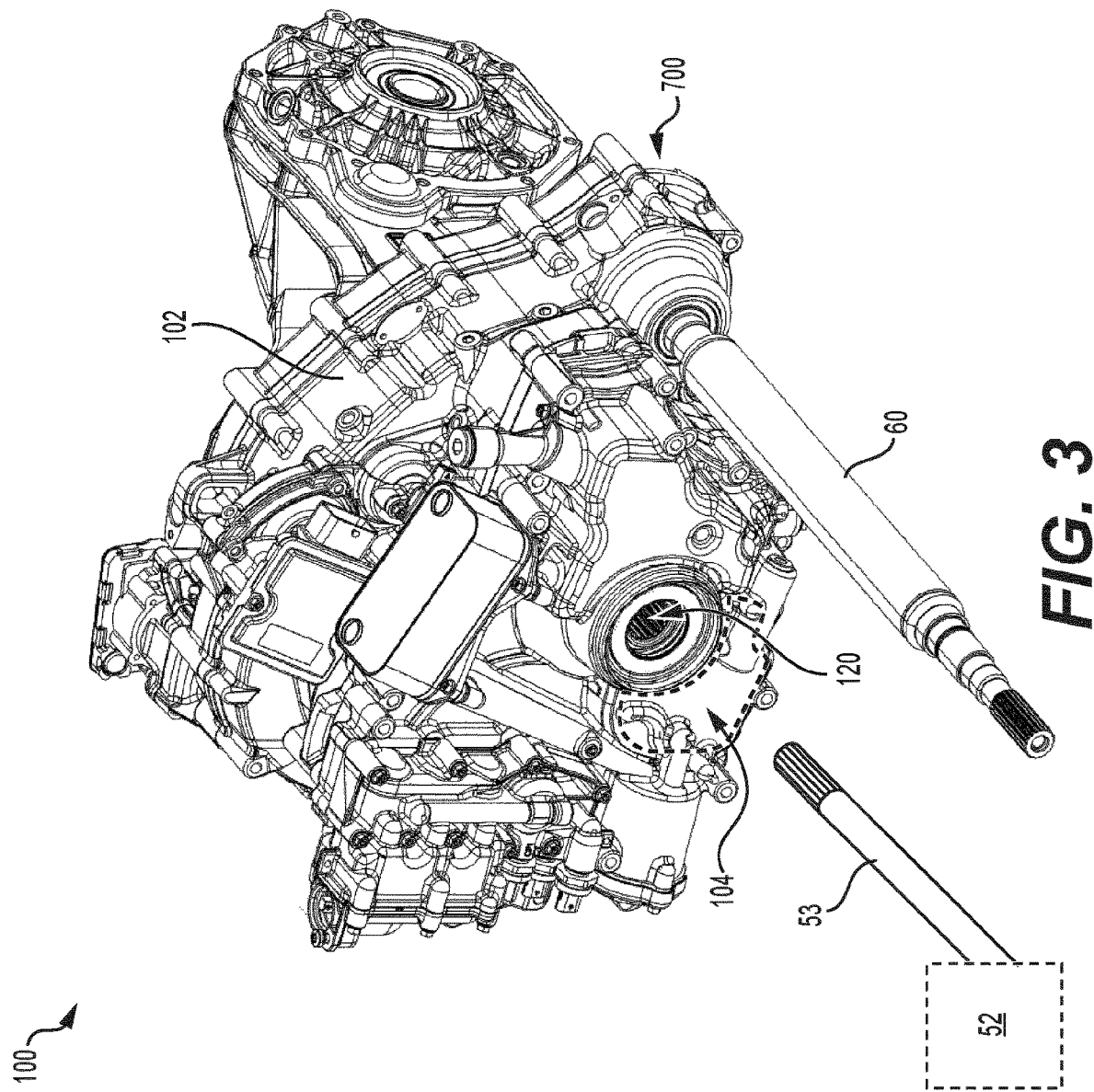
FIG. 3 is a perspective view taken from a top, front, left side of a dual-clutch transmission and front propeller shaft of the vehicle of FIG. 1.

Referring to FIG. 2, an internal combustion engine 52 (schematically shown in FIGS. 2 and 3) is connected to the frame 22 in a rear portion of the vehicle 20. The engine 52 has a crankshaft 53 (schematically shown in FIG. 3) that is connected to the DCT 100 disposed behind the engine 52 (both schematically shown in FIG. 2). The DCT 100 includes a subtransmission 700 (FIGS. 4, 5 and 14) operatively connected to a driveline 54 (schematically shown in FIG. 2) of the vehicle 20 for operatively connecting the front and rear wheels 24, 28 to the engine 52 in order to propel the vehicle 20. A gear shifter 56 (FIG. 2) located between the seats 44, 46 operates the DCT 100 and the subtransmission 700 of the vehicle 20, and enables the driver to select one of a plurality of gear configurations for operation of the vehicle 20. It is contemplated that paddle shifters (not shown) could be mounted to the steering wheel 48 for enabling the driver to select a gear for operation of the vehicle 20. In the illustrated implementation of the vehicle 20, the gear configurations made available by the DCT 100 include a reverse gear, and forward first, second, third, fourth, fifth, sixth and seventh gear. The gear configurations made available by the subtransmission 700 include park, neutral, high forward gears, and low forward gears. Thus, the DCT 100 and the subtransmission 700 enable fourteen different forward-going gear configurations and two different reverse gear configurations. It is contemplated that the sequence and/or number of gear configurations could be different than as shown herein in other implementations.

A driving mode selector button 58 (FIG. 2) also enables the driver to select 2×4 or 4×4 operation of the vehicle 20. More particularly, the driveline 54 includes a front propeller shaft 60 which extends horizontally to the left of the engine 52 towards a front differential assembly 62 (schematically shown in FIG. 2). The front differential assembly 62 is operatively connected to the front wheels 24 via front wheel axle assemblies (not shown). The front differential assembly 62 includes an electronic selector 64 (also schematically shown in FIG. 2) operatively connected to the driving mode selector button 58. The electronic selector 64 allows to selectively connect the front propeller shaft 60 to the front wheel axle assemblies to enable 4×4 driving mode of the vehicle 20, or to selectively disconnect the front propeller shaft 60 from the front wheel axle assemblies to enable 2×4 driving mode of the vehicle 20 (i.e. with only the rear wheels 28 propelling the vehicle 20).

The vehicle 20 further includes other components such as brakes, a radiator, headlights, and the like. As it is believed that these components would be readily recognized by one of ordinary skill in the art, further explanation and description of these components will not be provided herein.

Turning now to FIGS. 3 to 14, the DCT 100 will be described in more detail. The DCT 100 includes a housing 102 that is separate from the internal combustion engine 52. The housing 102 is flanged to a rear face of the internal combustion engine 52. In addition, the housing 102 has a dedicated hydraulic and lubrication oil circuit, separated from that of the engine 52. A transmission fluid pump 104 (schematically shown in FIG. 3) is received inside the housing 102. The transmission fluid pump 104 is adapted to selectively pump oil-based fluids. Again, in the present implementation, the transmission fluid pump 104 is separated from any other pump(s) the engine 52 may have.

Figure 4:
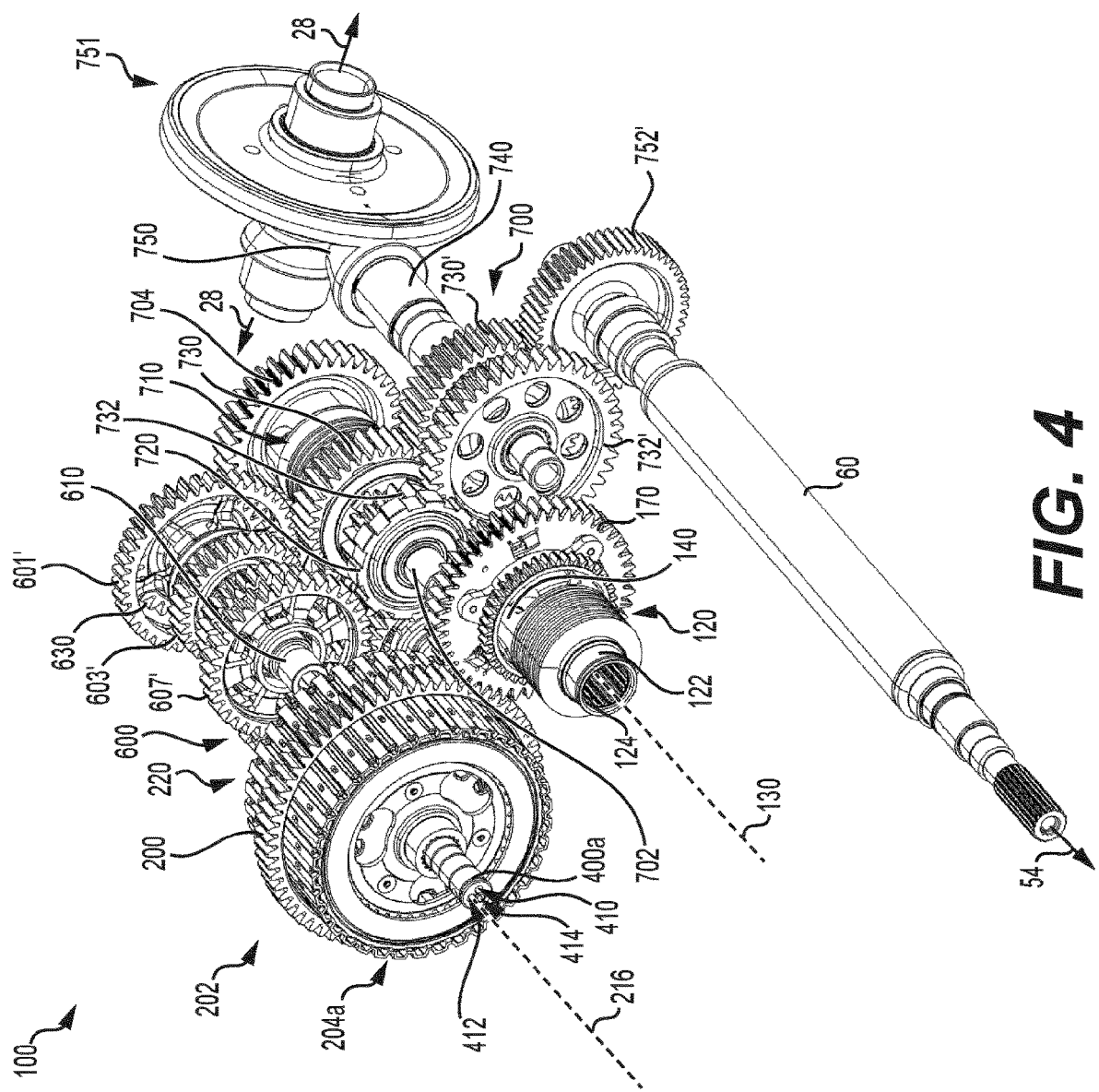
FIG. 4 is a perspective view taken from a top, front, left side of the dual-clutch transmission and front propeller shaft of FIG. 3, with a housing of the dual-clutch transmission removed.
Figure 5:
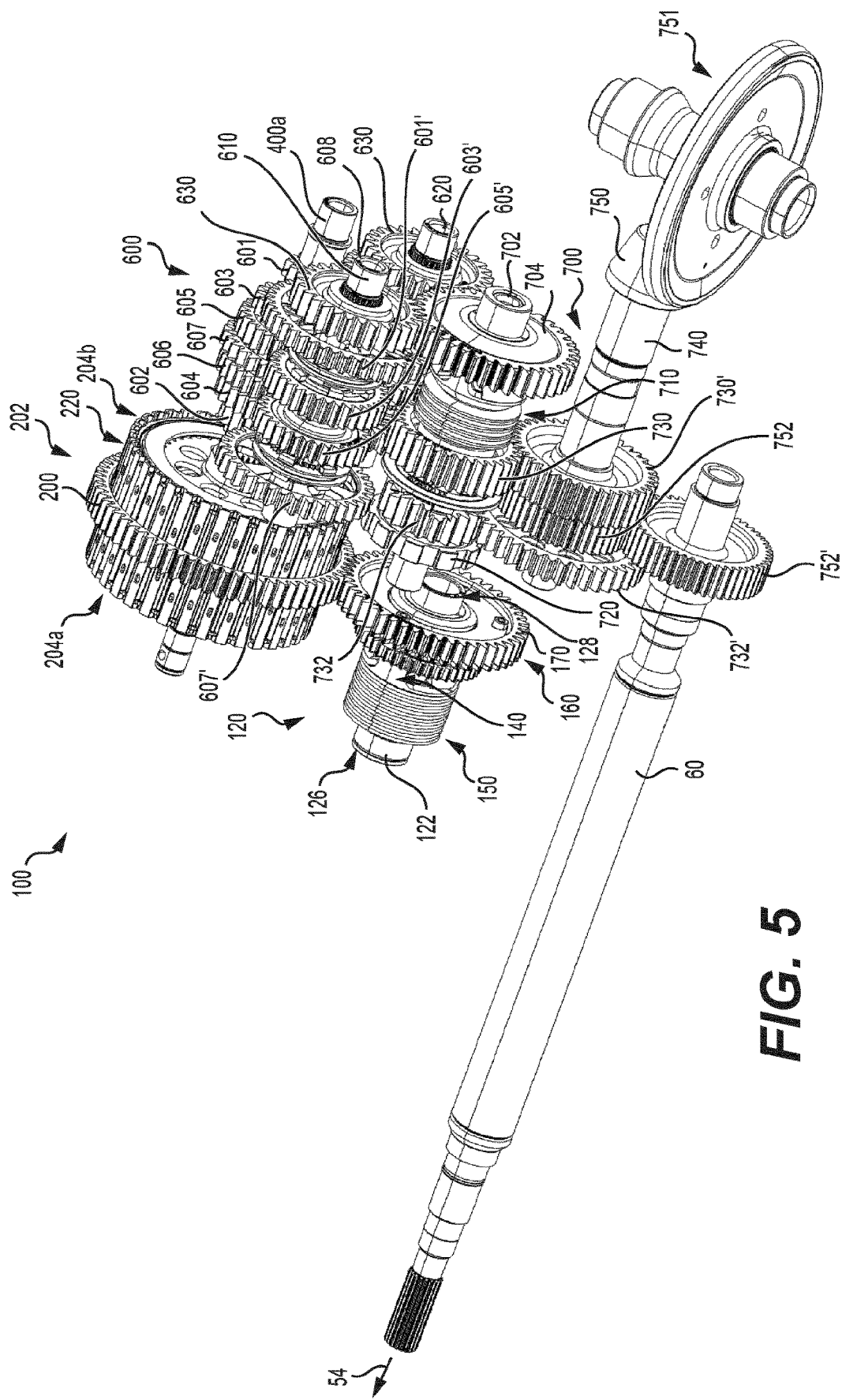
FIG. 5 is a perspective view taken from a top, rear, left side of the dual-clutch transmission and front propeller shaft of FIG. 4.
Figure 6:
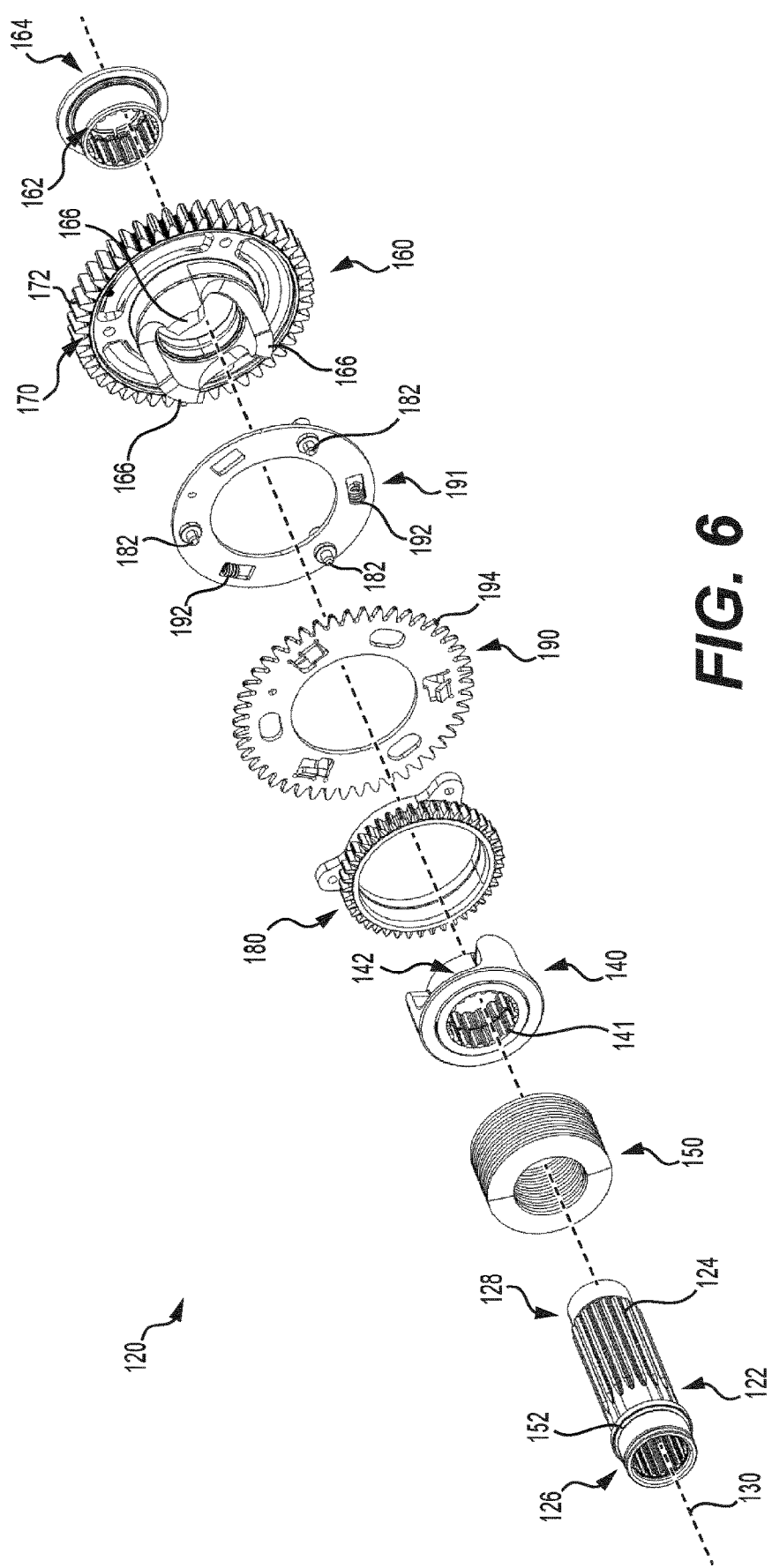
FIG. 6 is an exploded, perspective view taken from a top, front, left side of an input damper of the dual-clutch transmission of FIG. 3.
Figure 8:
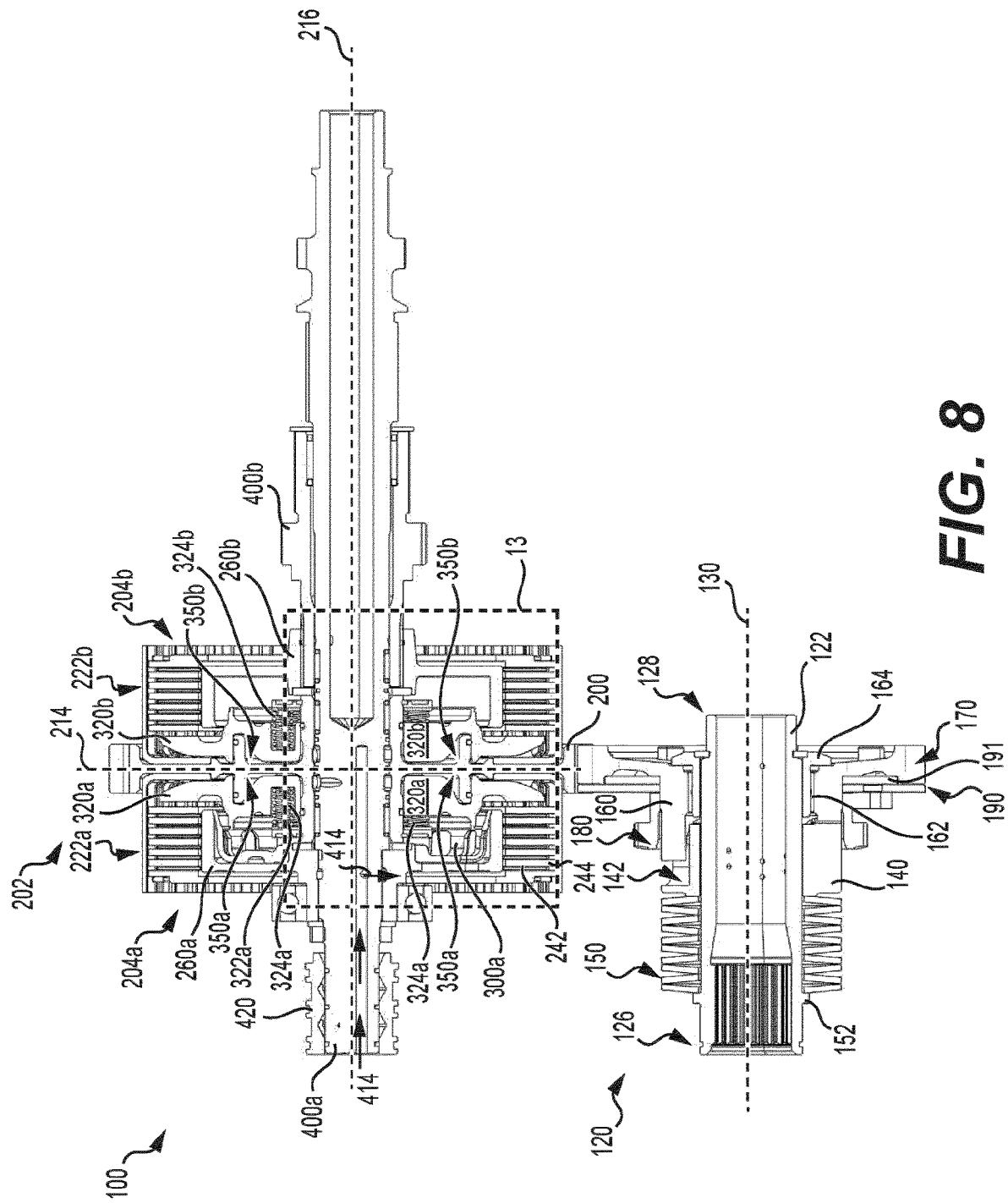
FIG. 8 is a longitudinal cross-sectional view of the dual-clutch and the input damper of the dual-clutch transmission of FIG. 3.

Referring to FIGS. 4 to 6, the DCT 100 includes an input damper 120 adapted to reduce the torque variations from the crankshaft 53 to the DCT 100. The input damper 120 has a hollow shaft 122 defining splines 124 for connection to the crankshaft 53 (as can be understood from FIG. 3). The hollow shaft 122 has a front end 126 and a rear end 128 defined consistently with the forward travel direction of the vehicle 20 (FIGS. 6 and 8). The hollow shaft 122 also defines an input damper axis 130 about which the hollow shaft 122 rotates. An input member 140 is slidably engaged to the hollow shaft 122 and positioned between the front and rear ends 126, 128. The input member 140 has splines 141 complementary to splines 124, and the input member 140 can slide axially along the input damper axis 130 between the front and rear ends 126, 128. The input member 140 defines three recesses 142 angularly displaced by about 120 degrees relative to the input damper axis 130. A disc spring assembly 150 is connected to the hollow shaft 122 and extends between the front and rear ends 126, 128. The disc spring assembly 150 abuts a shoulder 152 of the hollow shaft 122 and biases the input member 140 axially along the input damper axis 130 towards the rear end 128 of the hollow shaft 122. An output member 160 is disposed over the hollow shaft 122 and positioned between the input member 140 and the rear end 128 of the hollow shaft 122. The output member 160 is supported by bearings 162 disposed between the output member 160 and a connector 164 disposed adjacent the rear end 128 of the hollow shaft 122. The connector 164 retains the output member 160 on the hollow shaft 122. The output member 160 defines three cams 166 also angularly displaced by about 120 degrees relative to the input damper axis 130 (FIG. 6). The three cams 166 are structured and configured for engaging the corresponding three recesses 142 of the input member 140 when the input member 140 is biased towards the rear end 128 of the hollow shaft 122. An output gear 170 is connected to the output member 160, and also rotates about the input damper axis 130. The output gear 170 has a plurality of teeth 172. A pump gear 180 is connected to the output gear 170 via three fasteners 182, and extends between the output gear 170 and the disc spring assembly 150. The pump gear 180 also rotates about the input damper axis 130. The pump gear 180 is adapted to drive the transmission fluid pump 104 (FIG. 2). An auxiliary output gear 190 is connected to the output gear 170 via a ring 191 having coil spring assemblies 192. The auxiliary output gear 190 is biased by the coil spring assemblies 192 and has a plurality of teeth 194. In the present implementation, the number of teeth 172 of the output gear 170 matches the number of teeth 194 of the auxiliary output gear 190. The coil spring assemblies 192 permits angular displacements of the auxiliary output gear 190 about the input damper axis 130 relative to the output gear 170. The auxiliary output gear 190 provides preload on the teeth 172 of the output gear 170 and reduces backlash that can occur between the output gear 170 and a central clutch gear 200 described below.

Figure 7:
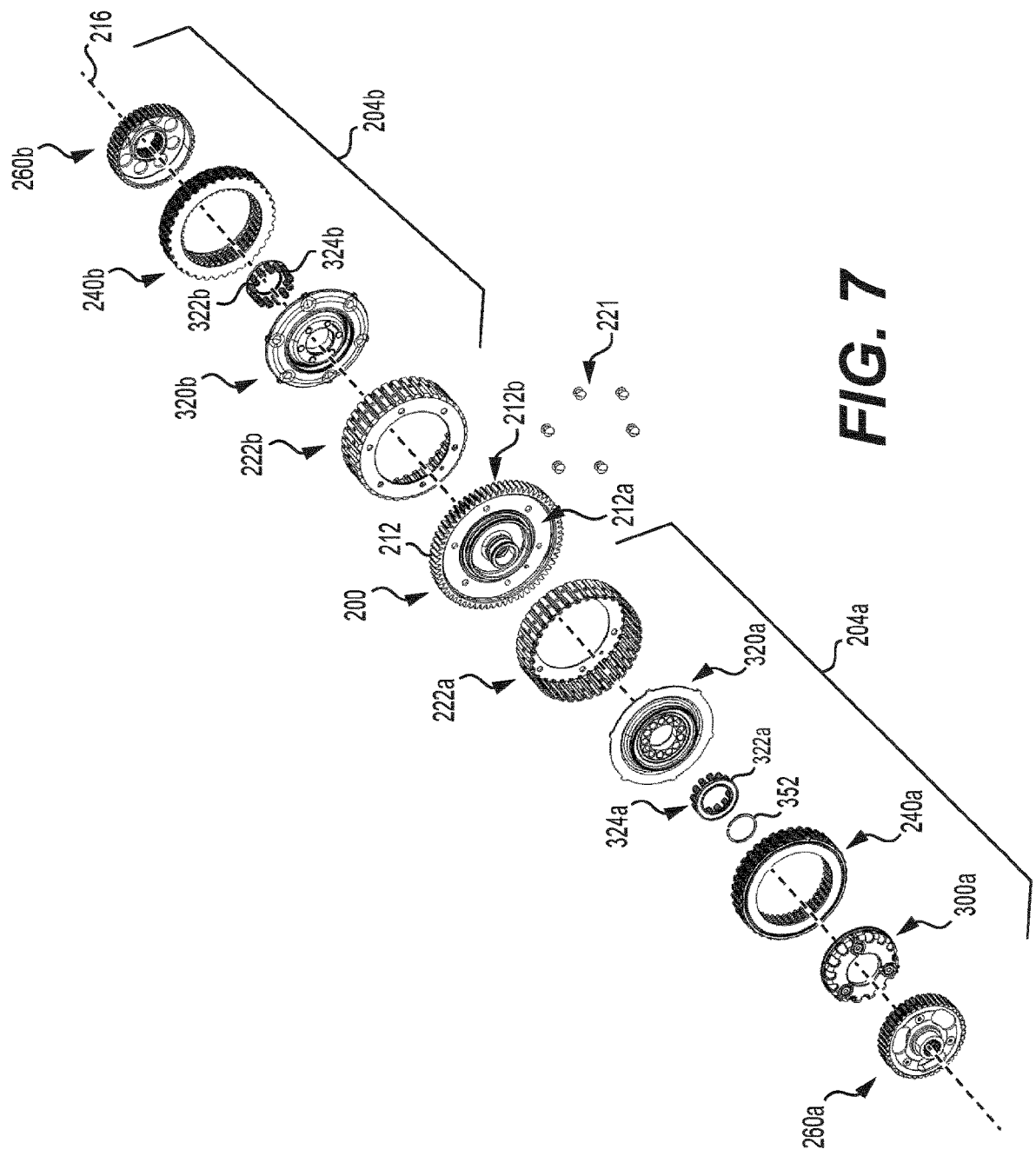
FIG. 7 is an exploded, perspective view taken from a top, front, left side of a dual-clutch of the dual-clutch transmission of FIG. 3.
Figure 9:
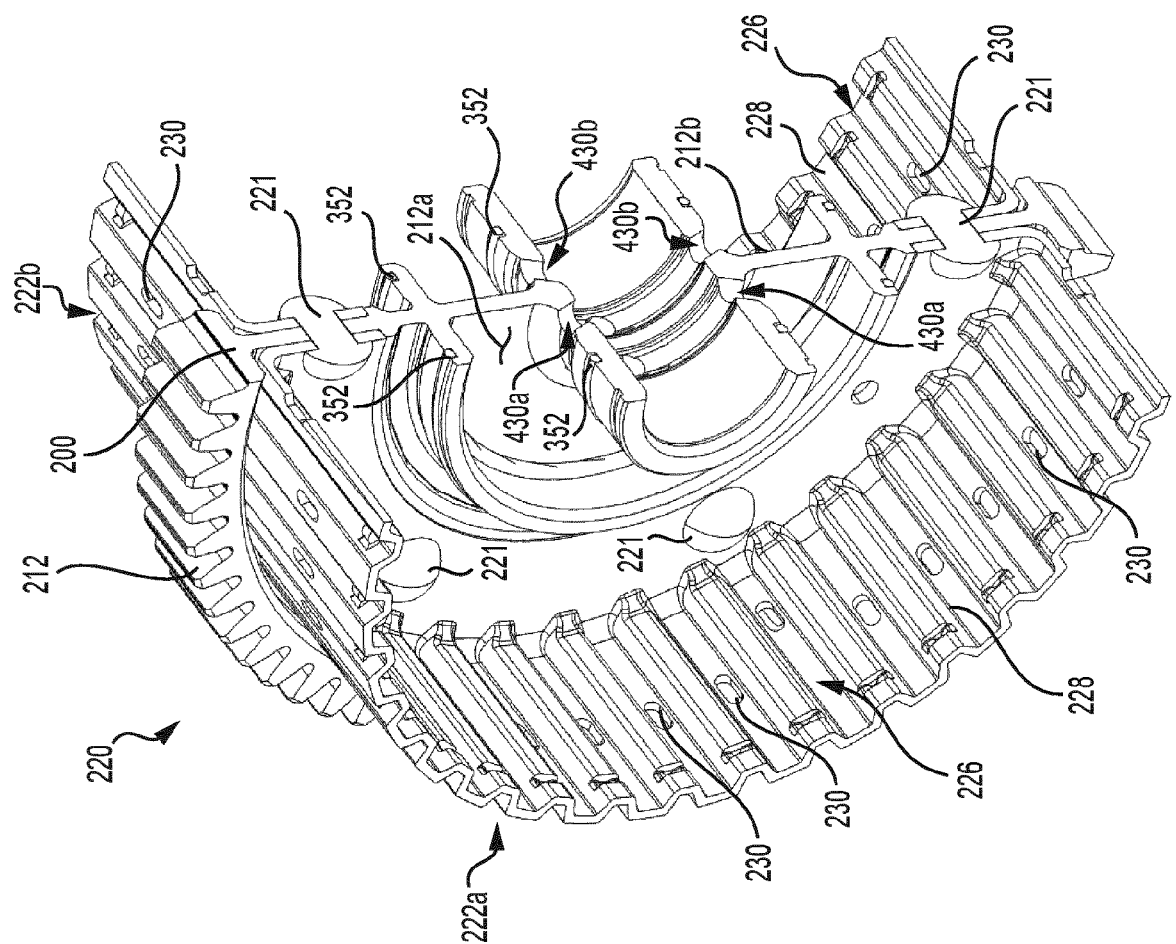
FIG. 9 is a perspective, longitudinal cross-sectional view of the clutch pack drum and the central clutch gear of the dual-clutch of FIG. 7.

Referring to FIGS. 4 to 8, the DCT 100 includes a dual-clutch 202 having first and second clutches 204a, 204b. Before describing in details the first and second clutches 204a, 204b, components of the dual clutch 202 will be described. The dual clutch 202 includes a clutch pack drum 220 that is adapted to rotate inside the housing 102, and the central clutch gear 200 is connected to the clutch pack drum 220 via fasteners 221 (FIGS. 7 and 9). The central clutch gear 200 has teeth 212 adapted to mesh with the teeth 172, 194 of the output gear 170 and the auxiliary output gear 190. The central clutch gear 200 is thus operatively connected to the crankshaft 53 of the internal combustion engine 52 via the input damper 120. It is to be noted that having the input damper 120 located outside the clutch pack drum 220 offers more flexibility to package the DCT 100 in the rear portion of the frame 22 of the vehicle 20 supporting the engine 52 and the DCT 100. Thus, having the input damper 120 located outside the clutch pack drum 220 improves the overall packaging of the DCT 100 in the rear portion of the vehicle 20. Moreover, having the input damper 120 located outside the clutch pack drum 220 allows for a greater angle of relative rotation between the input member 140 and the output member 160 compared to an input damper that would be integrated in the clutch pack drum 220. The greater angle of relative rotation between the input member 140 and the output member 160 improves the damping provided by the input damper 120.

Referring to FIGS. 7 and 9, the central clutch gear 200 has a front face 212a and a rear face 212b. The central clutch gear 200 defines a clutch gear plane 214 and a clutch gear rotation axis 216 normal to the clutch gear plane 214 (FIG. 8). It is to be appreciated that the clutch gear rotation axis 216 is parallel to the input damper axis 130, and extends above and to the right of the input damper axis 130 (FIG. 4).

Referring to FIGS. 7 to 9, the clutch pack drum 220 includes a front clutch pack basket 222a disposed in front of the central clutch gear 200, and a rear clutch pack basket 222b disposed behind the central clutch gear 200. The front and rear clutch pack baskets 222a, 222b are interconnected using the fasteners 221 extending through the central clutch gear 200. The front and rear clutch pack baskets 222a, 222b are identical. In some implementations, the front and rear clutch pack baskets 222a, 222b are symmetrical about the clutch gear plane 214. The front and rear clutch pack baskets 222a, 222b could be structured otherwise in other implementations. Having the front and rear clutch pack baskets 222a, 222b identical, or symmetrical about the clutch gear plane 214, assists in reducing the manufacturing costs of the DCT 100. The front and rear clutch pack baskets 222a, 222b each have a cylindrical wall 226 defining splines 228 and a plurality of holes 230.

Turning now to FIGS. 7 to 13C, the first clutch 204a will be described in details first. The operation of the first and second clutches 204a, 204b, and the flow of fluid through the DCT 100 will be described further below. A front clutch pack 240a is received in the clutch pack basket 222a and is disposed in front of the central clutch gear 200. The clutch pack 240a includes a plurality of clutch plates 242 having teeth 244 extending away from the clutch gear rotation axis 216 and engaging the splines 228 of the clutch pack basket 222a for rotating with the clutch pack drum 220 (FIG. 13A). The clutch plates 242 are movable axially in a direction 246 (see double arrow 246 in FIGS. 13A to 13C) defined by the clutch gear rotation axis 216. The clutch plates 242 have disc surfaces including relatively low friction material. The front clutch pack 240a further includes a plurality of clutch disks 250 disposed alternatingly with the clutch plates 242 in the direction 246 (FIG. 13A). The clutch disks 250 have disc surfaces including a relatively high friction material. The clutch disks 250 have teeth 254 extending towards the clutch gear rotation axis 216. The clutch disks 250 are also movable axially in the direction 246 defined by the clutch gear rotation axis 216. As will become apparent from the description below, when the clutch disks 250 are selectively engaged by the clutch plates 242, the clutch disks 250 rotate with the clutch pack drum 220.

Figure 10:
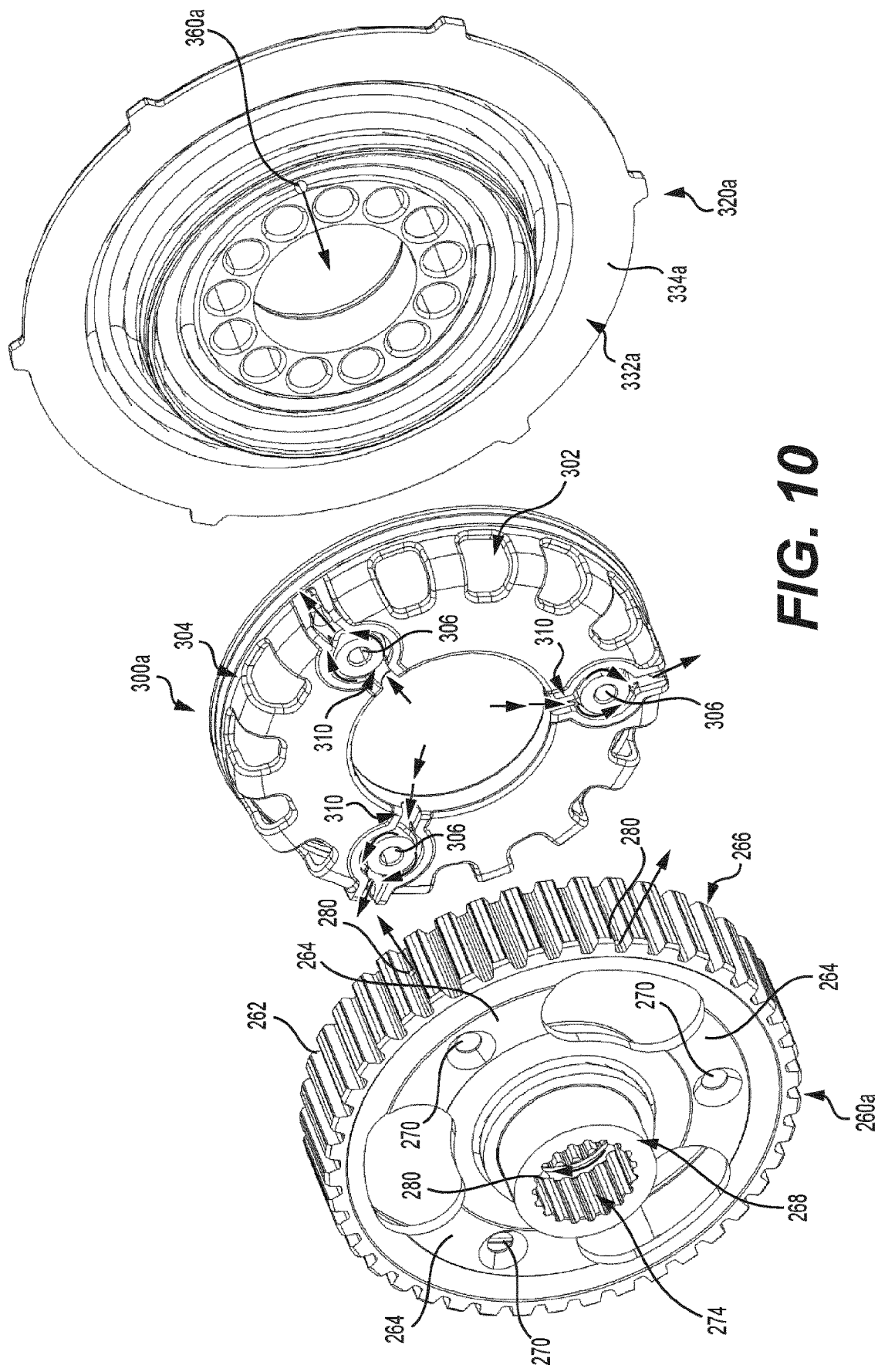
FIG. 10 is an exploded, perspective view taken from a top, front, left side of the front clutch hub, front lubrication cover and front pressure plate of the dual-clutch of FIG. 7.
Figure 11:
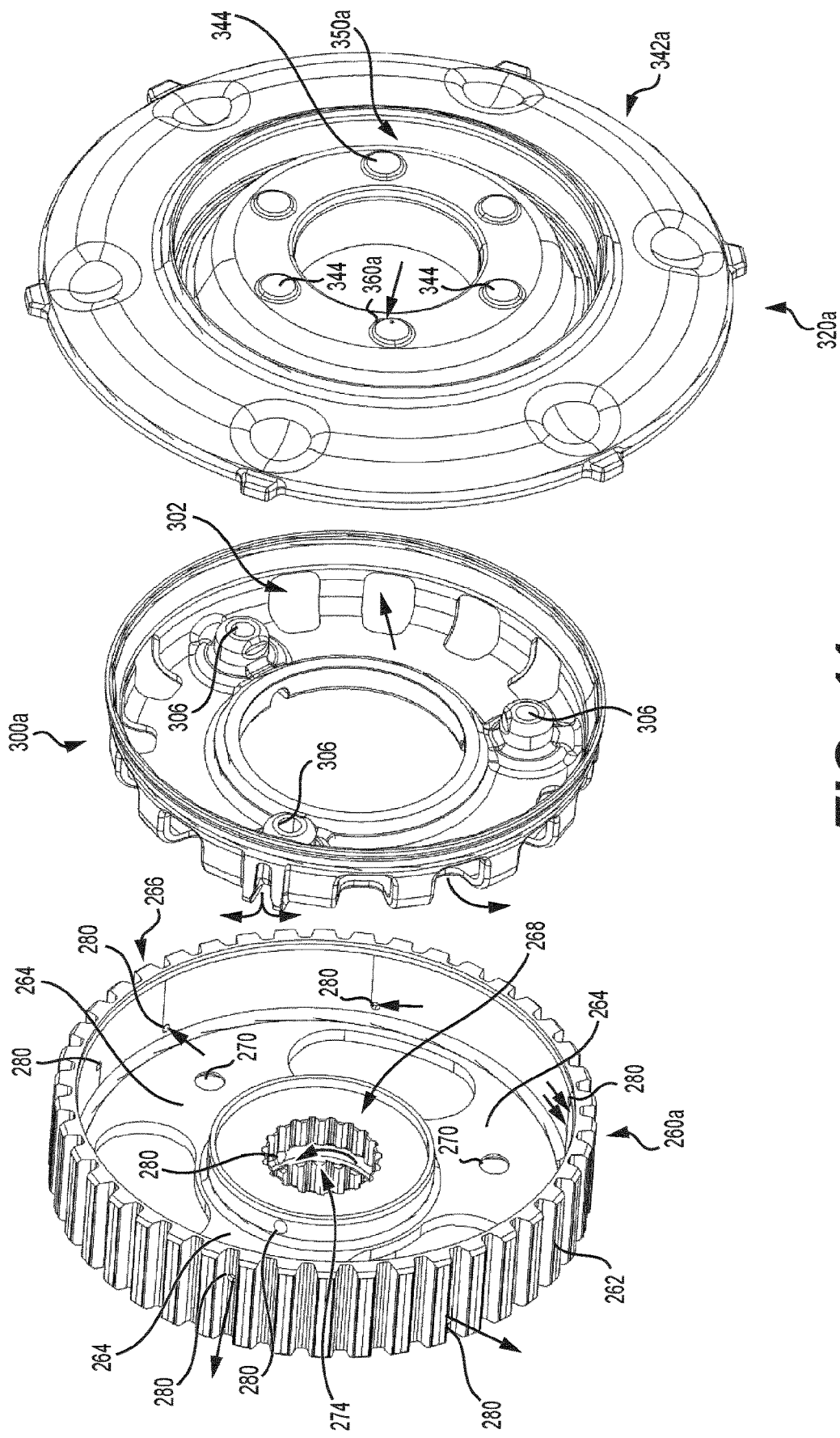
FIG. 11 is an exploded, perspective view taken from a rear, left side of the front clutch hub, front lubrication cover and front pressure plate of the dual-clutch of FIG. 7.
Figure 13A:
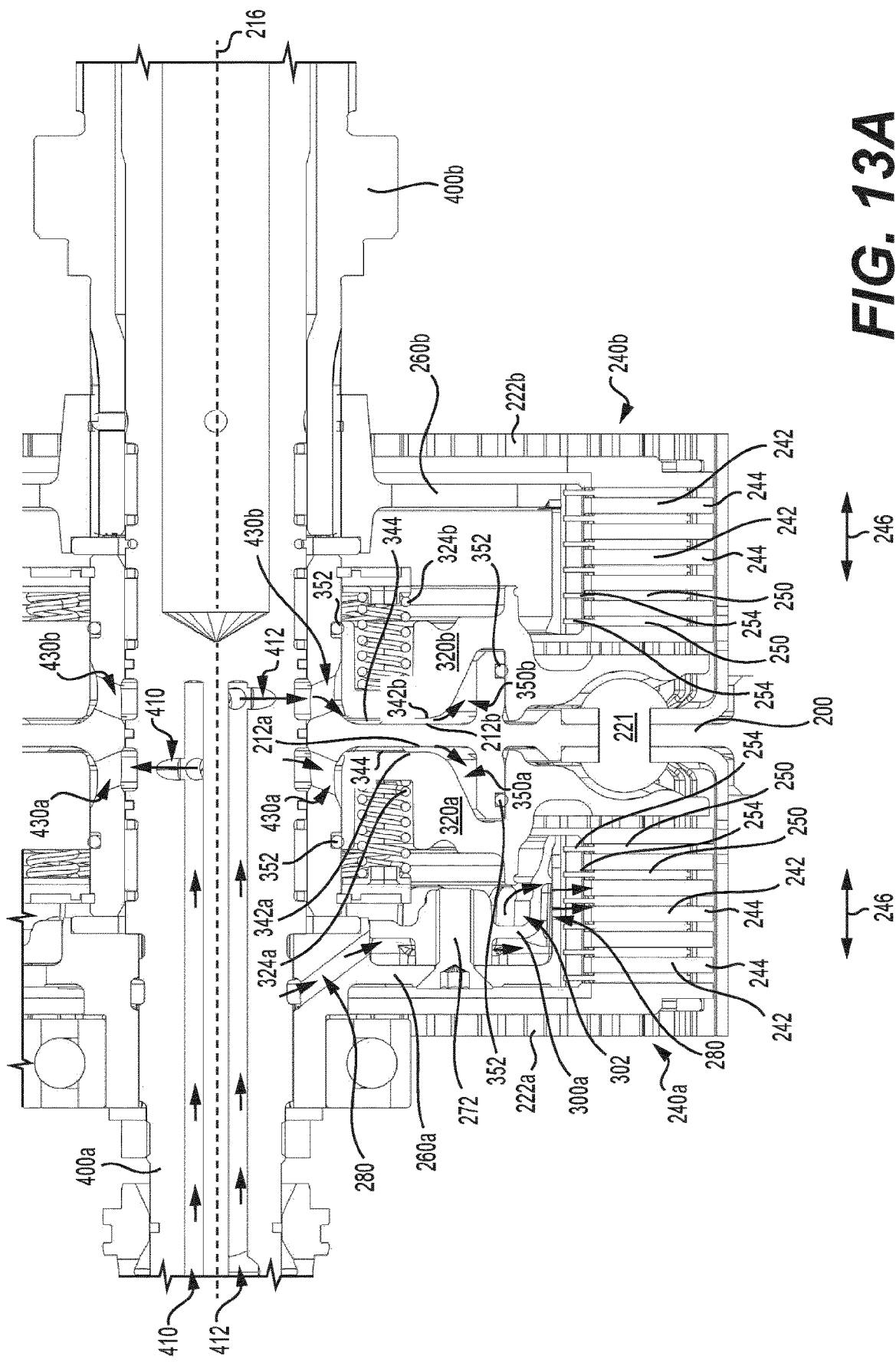
FIG. 13A is a close-up view of portion 13 of FIG. 8, with the front and rear pressure plates abutting the central clutch gear of the dual-clutch of FIG. 7.

Referring to FIGS. 7, 10 and 11, a front clutch hub 260a is received in the clutch pack 240a and is disposed in front of the central clutch gear 200. The clutch hub 260a defines splines 262 structured to engage with the teeth 254 of the clutch disks 250 of the clutch pack 240a. The clutch disks 250 are movable axially relative to the clutch hub 260a in the direction 246 defined by the clutch gear rotation axis 216 as the teeth 254 slide axially in the splines 262. When the clutch disks 250 are selectively engaged by the clutch plates 242, the clutch hub 260a rotates with the clutch pack drum 220. The clutch hub 260a has three arms 264 connecting a rim portion 266 of the clutch hub 260a (defining the splines 262) to a central portion 268 of the clutch hub 260a. Holes 270 are defined in each of the arms 264 for receiving fasteners 272 (FIG. 13A). The central portion 268 defines splines 274. Referring to FIGS. 10, 11 and 13A, a plurality of bores 280 are defined in the central portion 268, in the arms 264 and in the rim portion 266. The bores 280 are adapted for allowing flow of fluid therethrough, as will become apparent from the following description.

Referring to FIGS. 10 and 11, a lubrication cover 300a is also received in the clutch pack 240a. The lubrication cover 300a is disposed in front of the central clutch gear 200 and behind the front clutch hub 260a. The lubrication cover 300a defines a plurality of apertures 302 on a rim portion 304 thereof. Three threaded holes 306 are defined in the lubrication cover 300a for receiving the fasteners 272. When the fasteners 272 extend through the holes 270 of the clutch hub 260a and are engaged in the threaded holes 306 of the lubrication cover 300a, the lubrication cover 300a and the clutch hub 260a are interconnected. Passages 310 are defined in the lubrication cover 300a and extend around each one of the threaded holes 306. The passages 310 are adapted for allowing flow of fluid therethrough, as will become apparent from the following description.

Figure 13B:
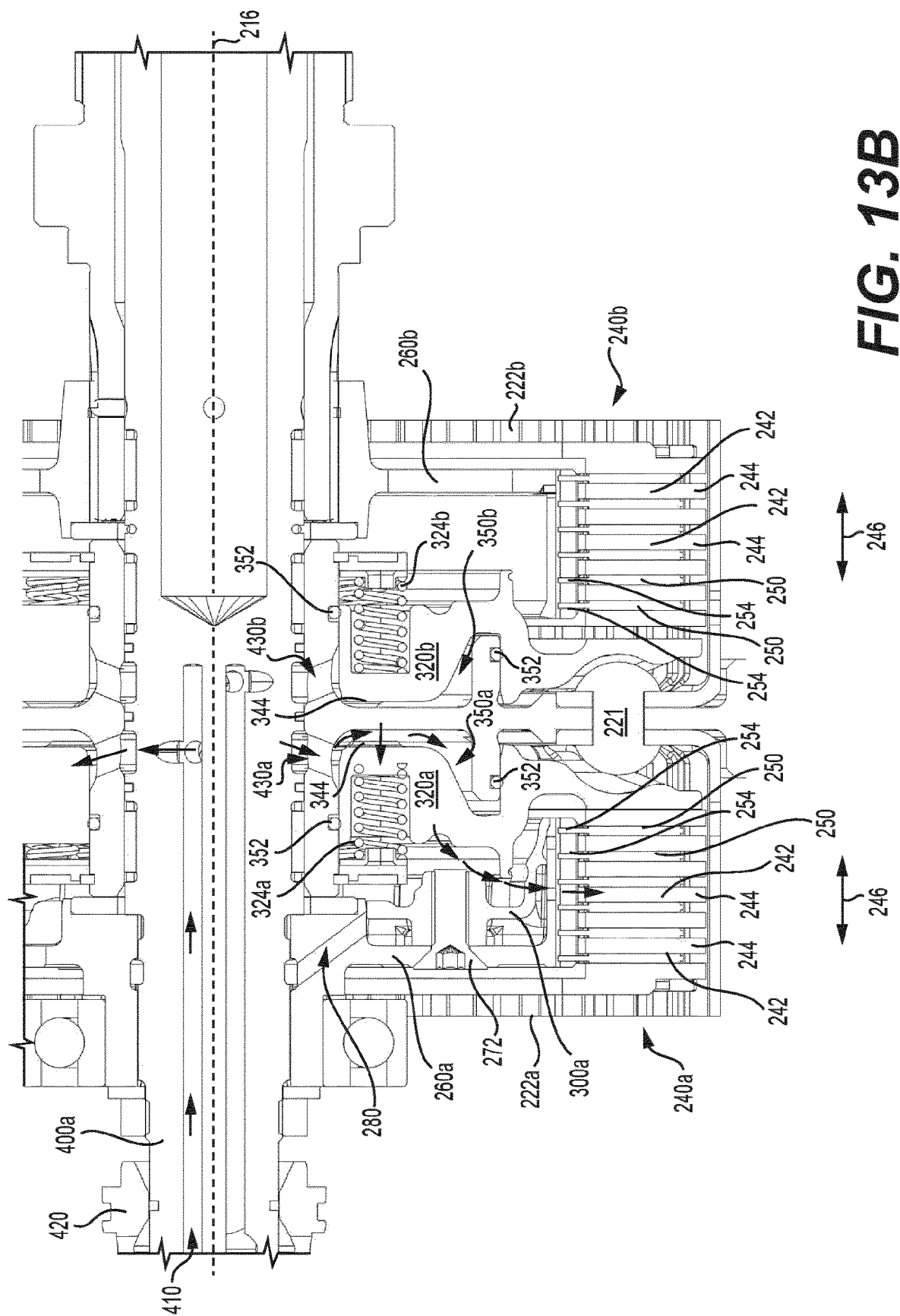
FIG. 13B is a close-up view of portion 13 of FIG. 8, with the front pressure plate being moved axially away from the central clutch gear of the dual-clutch of FIG. 7, and with the rear pressure plate abutting the central clutch gear.
Figure 13C:
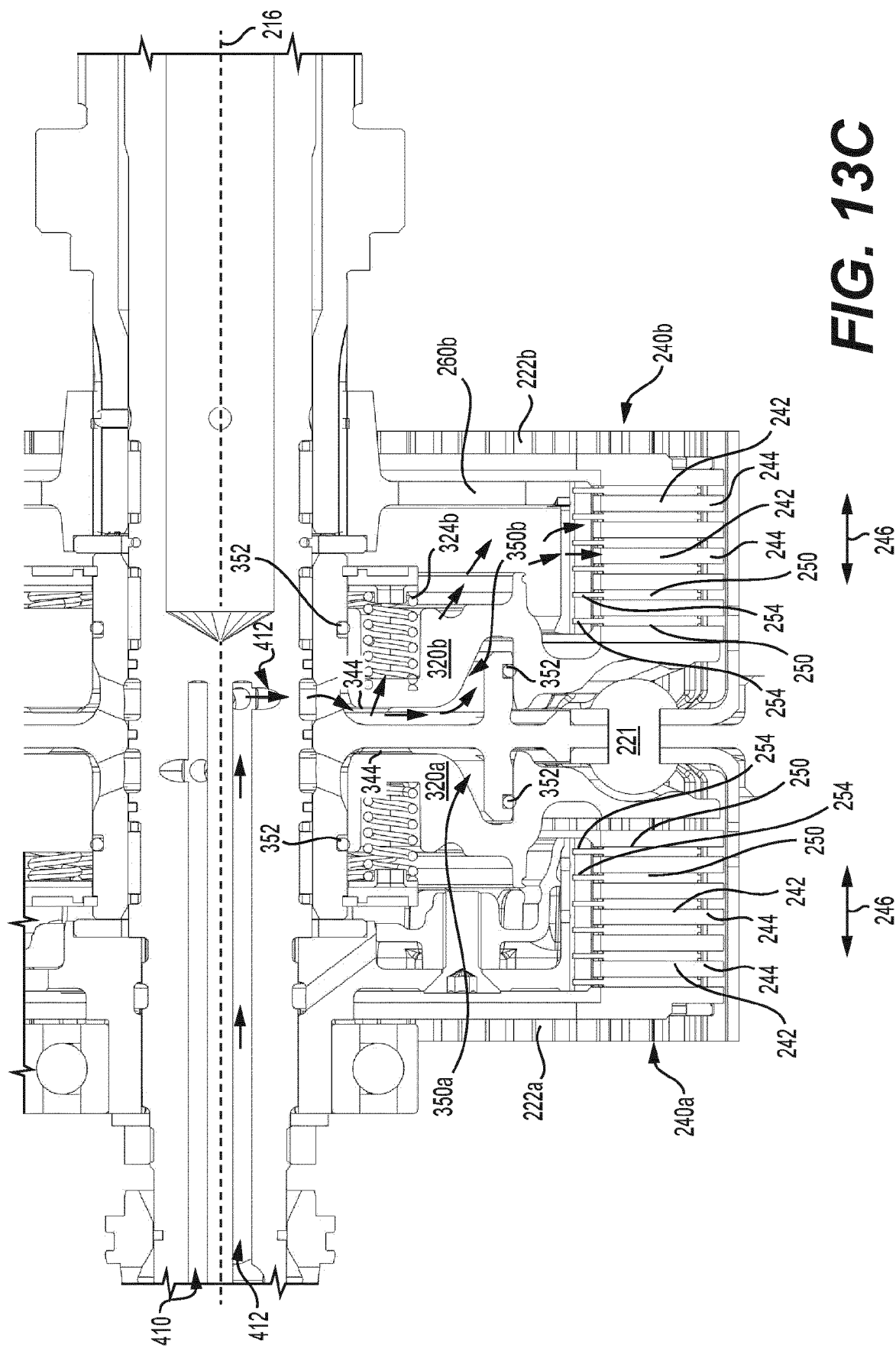
FIG. 13C is a close-up view of portion 13 of FIG. 8, with the rear pressure plate being moved axially away from the central clutch gear of the dual-clutch of FIG. 7, and with the front pressure plate abutting the central clutch gear.

Referring to FIGS. 7, 10, 11 and 13A, the DCT 100 further includes a pressure plate 320a disposed in front of the central clutch gear 200. The pressure plate 320a is disposed between the central clutch gear 200 and the lubrication cover 300a. A ring 322a is connected to the central clutch gear 200, and coil spring assemblies 324a interconnect the pressure plate 320a to the central clutch gear 200. The pressure plate 320a rotates with the central clutch gear 200, and is movable axially in the direction 246 upon compression and extension of the coil spring assemblies 324a. The pressure plate 320a has a front face 332a (FIG. 10) including a rim portion 334a. The rim portion 334a of the pressure plate 320a is structured to selectively engage the clutch plate 242 that is closest to the central clutch gear 200. The pressure plate 320a further has a rear face 342a (FIG. 11) where six pads 344 project therefrom. The pads 344 are structured for abutting the front face 212a of the central clutch gear 200 and to leave a spacing between the front face 212a of the central clutch gear 200 and the rear face 342a of the pressure plate 320a (the spacing is shown in FIG. 13A). Referring to FIGS. 13A to 13C, a chamber 350a is defined between the front face 212a of the central clutch gear 200 and the rear face 342a of the pressure plate 320a. Seals 352 are disposed between the pressure plate 320a and the central clutch gear 200 to prevent fluid from escaping the chamber 350a through the regions where the seals 352 extend. The pressure plate 320a further defines a pressure plate passage 360a extending between the front face 332a and the rear face 342a. More particularly, the pressure plate passage 360a starts on the rear face 342a from one of the pads 344 (FIG. 11). The pressure plate passage 360a is adapted for allowing flow of fluid therethrough, as will become apparent from the following description.

Referring to FIGS. 4, 8, and 13A, a shaft 400a is connected to the front clutch hub 260a via teeth (not shown) engaging the splines 274 of central portion 268. The shaft 400a is coaxial with the clutch gear rotation axis 216. The shaft 400a defines three passages 410, 412 (FIG. 13A), and 414 (FIG. 8) adapted for flowing fluid therethrough. A manifold 420 (FIG. 8) is connected to the front portion of the shaft 400a. The manifold 420 fluidly connects the transmission fluid pump 104 to the passages 410, 412, 414. Three plugs (not shown) seal the ends of the passages 410, 412, 414 defined in the front portion of the shaft 400a (FIG. 4). Referring to FIGS. 4, 5 and 14, a plurality of transmission gears 600 are operatively connected to the shaft 400a. The transmission gears 600 include the gears corresponding to the first gear 601, third gear 603, fifth gear 605, and seventh gear 607 of the DCT 100. The transmission gears 600 are all disposed behind the central clutch gear 200.

Arrows show the flow of fluid through the dual-clutch 202 in FIGS. 10, 11, 13A and 13B when the dual-clutch 202 rotates. When fluid is selectively supplied in the passage 410 from the transmission fluid pump 104, fluid flows through the shaft 400a in the passage 410 (FIG. 13A), through passages 430a defined in the central clutch gear 200 (FIGS. 9 and 13A) and into the chamber 350a. Since the pads 344 abut the front face 212a of the central clutch gear 200, fluid flows through the spacing between the pressure plate 320a and the central clutch gear 200, and fills the chamber 350a.

The pads 344 are thus structured for selectively allowing flow of fluid from the passage 410 to the chamber 350a. When the fluid is selectively supplied with sufficient pressure by the transmission fluid pump 104, the pressurized fluid in the chamber 350a overcomes the biasing force of the coil spring assemblies 324a and moves the pressure plate 320a axially away from the central clutch gear 200 (i.e. forward of the central clutch gear 200), as shown between FIGS. 13A and 13B. The pressure plate 320a selectively squeezes the clutch plates 242 and the clutch disks 250 together for engaging the clutch plates 242 with the clutch disks 250. The front clutch hub 260a and the lubrication cover 300a are thus rotatable with the clutch pack drum 220 and the central clutch gear 200, and the shaft 400a drives the transmission gears 600 corresponding to the first gear 601, third gear 603, fifth gear 605 and seventh gear 607 of the DCT 100.

Referring to FIG. 13B, as some of the fluid escapes the chamber 350a through the pressure plate passage 360a (as shown by the arrows in FIG. 13B), fluid flows in the front clutch pack 240a and lubricates and cools the clutch plates 242, the clutch disks 250, and the clutch pack basket 222a, as shown by arrows in FIG. 13B. Fluid flows through the holes 230 of the clutch pack basket 222a, is collected in the housing 102 and is returned to the transmission fluid pump 104 for recirculation in the DCT 100. It is thus to be understood that in order for the pressure plate 320a to selectively squeeze the clutch pack 240a, pressurized fluid is continuously supplied in the chamber 350a by the transmission fluid pump 104.

Referring to FIG. 13A, when fluid is selectively supplied in the passage 414 (FIG. 8) and as the first clutch 204a rotates, fluid flows through the shaft 400a, through the bores 280 defined in the central portion 268, in the arms 264 and in the rim portion 266 of the front clutch hub 260a, and through the aperture 302 and passages 310 defined in the lubrication cover 300a, and on to the front clutch pack 240a, as shown by arrows in FIG. 13A. The fluid flowing through the passage 414 provides additional lubrication and cooling to the clutch plates 242, the clutch disks 250, and the clutch pack basket 222a of the first clutch 204a. Since the first clutch 204a is operatively connected to the transmission gear 600 corresponding to the first gear 601 of the DCT 100, which can have a heavy usage, for example, when the vehicle 20 launches repetitively, additional lubrication and cooling to the first clutch 204a provided by fluid flowing through the passage 414 and the bore 280 is advantageous under certain conditions.

Figure 12:
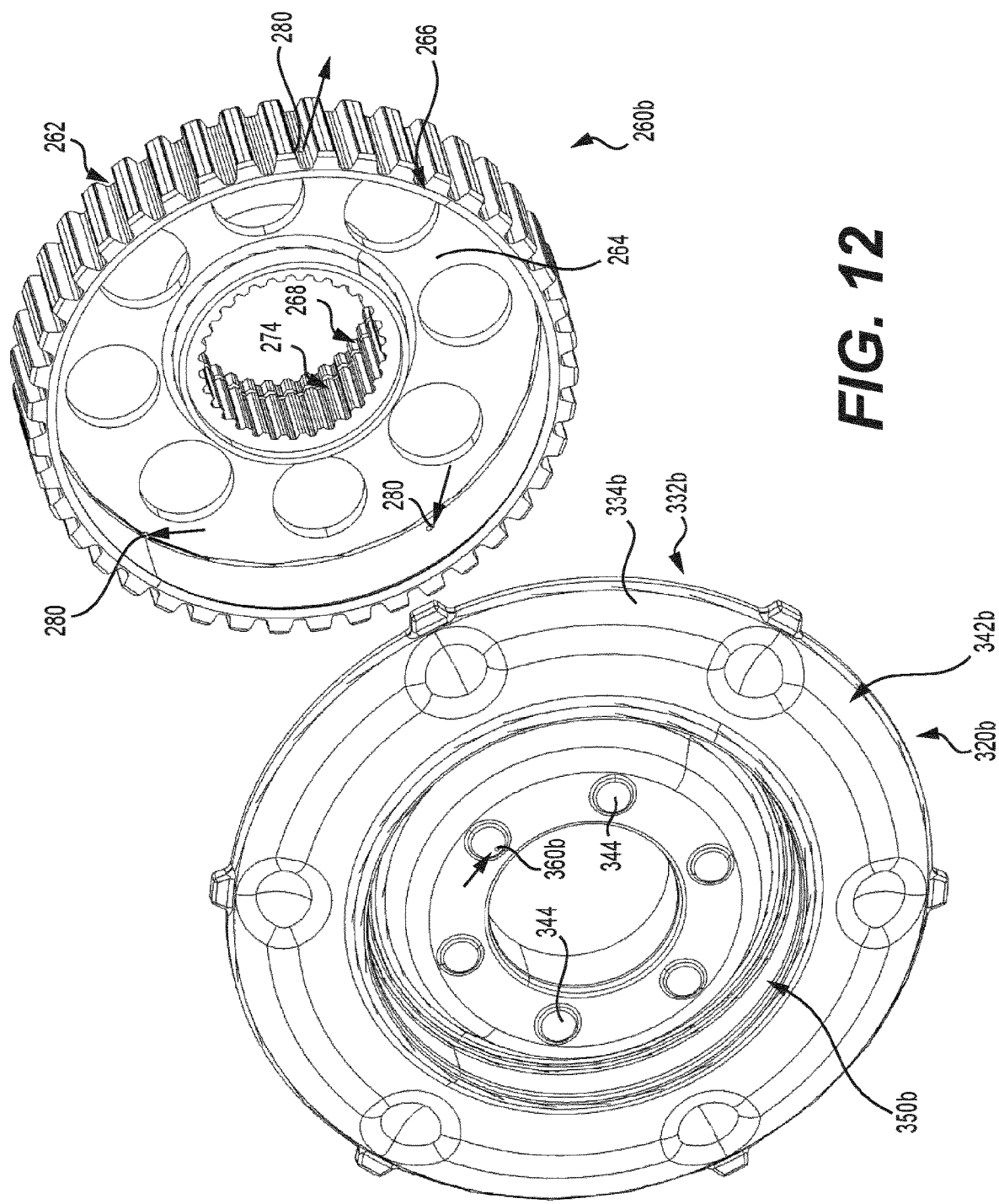
FIG. 12 is an exploded, perspective view taken from a top, front, left side of the rear pressure plate and rear clutch hub of the dual-clutch of FIG. 7.

Referring to FIGS. 7, 8 and 12, the second clutch 204b will now be described. A rear clutch pack 240b is received in the clutch pack basket 222b and is disposed behind the central clutch gear 200. The rear clutch pack 240b also includes a plurality of clutch plates 242 having teeth 244 extending away from the clutch gear rotation axis 216 and engaging the splines 228 of the clutch pack basket 222b for rotating with the clutch pack drum 220 (FIGS. 13A to 13C). In the present implementations, the front and rear clutch packs 240a, 240b are identical, but they could be structured otherwise in other implementations. This feature assists in reducing the manufacturing costs of the DCT 100. The clutch plates 242 have disc surfaces including a relatively low friction material. The rear clutch pack 240b further includes a plurality of clutch disks 250 disposed alternatingly with the clutch plates 242 in the direction 246 (FIG. 13A). The clutch disks 250 have disc surfaces including a relatively high friction material. The clutch disks 250 have teeth 254 extending towards the clutch gear rotation axis 216 (FIGS. 13A to 13C). The clutch disks 250 are also movable axially in the direction 246 defined by the clutch gear rotation axis 216.

Referring to FIGS. 7 and 12, a rear clutch hub 260b is received in the clutch pack 240b and is disposed behind the central clutch gear 200. The clutch hub 260b also defines splines 262 structured to engage with the teeth 254 of the clutch disks 250 of the clutch pack 240b. The clutch disks 250 are movable axially relative to the clutch hub 260b in the direction 246 (FIGS. 13A to 13C). When the clutch disks 250 are selectively engaged by the clutch plates 242, the clutch hub 260b rotates with the clutch pack drum 220. The clutch hub 260b has eight arms 264 connecting a rim portion 266 of the clutch hub 260b to the central portion 268 of the clutch hub 260b. The central portion 268 defines splines 274. Referring to FIG. 12, a plurality of bores 280 are also defined in the central portion 268, in the arms 264 and in the rim portion 266 of the clutch hub 260b. The bores 280 are adapted for allowing flow of fluid therethrough, as will become apparent from the following description.

Referring to FIGS. 7 and 12, the DCT 100 further includes a pressure plate 320b disposed behind the central clutch gear 200. The pressure plate 320b is disposed between the central clutch gear 200 and the clutch hub 260b. A ring 322b (FIG. 7) is connected to the central clutch gear 200, and coil spring assemblies 324b interconnect the pressure plate 320b to the central clutch gear 200. It is to be noted that the rings 322a, 322b are identical, and that the spring assemblies 324a, 324b are identical. These features assist in reducing the manufacturing costs of the DCT 100. The pressure plate 320b rotates with the central clutch gear 200, and is movable axially in the direction 246 upon compression and extension of the coil spring assemblies 324b. The pressure plate 320b has a rear face 332b including a rim portion 334b. The rim portion 334b of the pressure plate 320a is structured to selectively engage the clutch plate 242 of the rear clutch pack 240b that is closest to the central clutch gear 200. The pressure plate 320b further has a front face 342b where six pads 344 project therefrom. The pads 344 are structured for abutting the rear face 212b of the central clutch gear 200 and to leave a spacing defined between the rear face 212b of the central clutch gear 200 and the front face 342b of the pressure plate 320b (FIG. 13A). A chamber 350b is defined between the rear face 212b of the central clutch gear 200 and the front face 342b of the pressure plate 320b. Seals 352 are also disposed between the pressure plate 320b and the central clutch gear 200 to prevent fluid from escaping the chamber 350b through the regions where the seals 352 extend. The pressure plate 320b further defines a pressure plate passage 360b (FIG. 12) extending between the rear face 332b and the front face 342b. More particularly, the pressure plate passage 360b starts on the front face 342b from one of the pads 344. The pressure plate passage 360b is adapted for allowing flow of fluid therethrough, as will become apparent from the following description.

It is to be appreciated that in the illustrated implementation, the pressure plates 320a, 320b are identical. In some implementations, the pressure plates 320a, 320b are symmetrical about the clutch gear plane 214. These features assist in reducing the manufacturing costs of the DCT 100. Furthermore, there is no component similar to the lubrication cover 300a in the second clutch 204b.

Referring to FIGS. 13A to 13C, arrows show the flow of fluid through the dual-clutch 202 when the dual-clutch 202 rotates and fluid is selectively supplied in the passages 410, 412, 414. When fluid is selectively supplied in the passage 412 of the shaft 400a, fluid flows through the shaft 400a in the passage 412 (FIGS. 13A and 13C), through passages 430b defined in the central clutch gear 200 (FIG. 9) and into the chamber 350b. Since the pads 344 abut the rear face 212b of the central clutch gear 200, fluid flows through the spacing between the pressure plate 320b and the central clutch gear 200, and fills the chamber 350b. The pads 344 are thus structured for selectively allowing flow of fluid from the passage 412 to the chamber 350b. When the fluid is selectively supplied with sufficient pressure, the pressurized fluid in the chamber 350b overcomes the biasing force of the coil spring assemblies 324b and moves the pressure plate 320b axially away from the central clutch gear 200 (i.e. rearward of the central clutch gear 200), as shown between FIGS. 13A and 13C. The pressure plate 320b selectively squeezes the clutch plates 242 and the clutch disks 250 together for engaging the clutch plates 242 with the clutch disks 250. The rear clutch hub 260b is thus rotatable with the clutch pack drum 220 and the central clutch gear 200. As some of the fluid escapes the chamber 350b through the pressure plate passage 360b, fluid flows in the rear clutch pack 240b and lubricates and cools the clutch plates 242, the clutch disks 250, and the clutch pack basket 222b, as shown by arrows in FIG. 13C. Fluid flows through the holes 230 of the clutch pack basket 222b, is collected in the housing 102 and is returned to the transmission fluid pump 104 for recirculation in the DCT 100. It is thus to be understood that in order for the pressure plate 320b to selectively squeeze the clutch pack 240b, pressurized fluid is continuously supplied by the transmission fluid pump 104.

Furthermore, it is to be noted that in the DCT 100 of the present technology, having the central clutch gear 200 between the pressure plates 320a, 320b, and thus the chambers 350a, 350b on either side of the central clutch gear 200, assists in distributing the forces more evenly in the clutch pack drum 220. This feature also assists in reducing the rotating masses in the clutch pack drum 220.

Referring to FIG. 8, a hollow shaft 400b is connected to the rear clutch hub 260b via the splines 274 defined in the central portion 268 thereof. The shaft 400a extends through the shaft 400b. Another plurality of transmission gears 600 are operatively connected to the shaft 400b. Referring to FIG. 5, the transmission gears 600 include the gears corresponding to the second gear 602, fourth gear 604 and sixth gear 606 of the DCT 100, and the transmission gears 600 are also disposed behind the central clutch gear 200.

Referring back to FIGS. 4 and 5, the DCT 100 further includes a layshaft 610 having additional transmission gears 601', 603', 605', 607' operatively connected thereto. Each of the transmission gears 601', 603', 605', 607' on the layshaft 610 is selected to have a gear ratio with the corresponding transmission gear 601, 603, 605, 607 to correspond to the first, third, fifth and seventh gear of the DCT 100. The DCT 100 further includes another layshaft 620 having additional transmission gears (not shown) operatively connected thereto. Each of the transmission gears on the layshaft 620 is selected to have a gear ratio with the corresponding transmission gear 602, 604, 606 to correspond to the second, fourth and sixth gear of the DCT 100. The layshaft 620 further includes the transmission gear 608 corresponding to a reverse gear of the DCT 100. An output gear 630 is operatively connected to each of the layshafts 610, 620 to operatively connect the transmission gears 600 to the subtransmission 700. The DCT 100 further includes synchronizers, shift actuators and shift forks adapted to preselect an odd transmission gear on the shaft 400a while the vehicle 20 is being driven in an even transmission gear on the shaft 400b (and vice versa), and thus enable the driver to operate transmission gear changes when the driver operates the gear shifter 56.

Referring now to FIGS. 4, 5 and 14, the subtransmission 700 will be described in more details. The subtransmission 700 has an input shaft 702. An input gear 704 is operatively connected to the input shaft 702 via an output damper 710. The input gear 704 is selectively driven by the output gear 630 of the layshaft 610, or by the output gear 630 of the layshaft 620, depending on the transmission gear that is selected. The output damper 710 is operatively connected between the input gear 704 and the input shat 702. The output damper 710 has components similar to the input damper 120, and can reduce backlash that can occur between the driveline 54 of the vehicle 20 and the DCT 100. A parking lock gear 720 is operatively connected to the input shaft 702, and is adapted to lock the subtransmission 700, and thus the vehicle 20, when selected. The subtransmission 700 further includes a high transmission gear 730 and a low transmission gear 732 operatively connected to the input shaft 702.

The subtransmission 700 further includes an output shaft 740 configured for operative connection to the driveline 54 of the vehicle 20 (as shown by arrow 54 in FIGS. 4, 5 and 14). The output shaft 740 includes a high transmission gear 730' and a low transmission gear 732' operatively connected thereto. When the subtransmission 700 is in the high gear configuration (i.e. when the high transmission gear 730 drives the high transmission gear 730'), a first gear ratio is defined between the input shaft 702 and the output shaft 740. When the subtransmission 700 is in the low gear configuration (i.e. when the low transmission gear 732 drives the low transmission gear 732'), a second gear ratio is defined between the input shaft 702 and the output shaft 740. The first gear ratio (i.e. high gear ratio) is smaller than the second gear ratio (i.e. low gear ratio). The driver can thus select in which mode the subtransmission 700 is to be configured, i.e. between high gear ratio and low gear ratio, depending on the terrain on which the vehicle 20 travels, for example.

The output shaft 740 further has a bevel gear 750 defined in the rear portion thereof. The bevel gear 750 is adapted to operatively connect to a rear transaxle 751 of the vehicle 20 for driving the rear wheels 28 (as indicated by arrows 28 on FIG. 4). A front propeller shaft gear 752 is operatively connected to the output shaft 740, and is adapted to engage with a front propeller shaft gear 752' operatively connected to the front propeller shaft 60. As mentioned above, the front propeller shaft 60 selectively drives the front wheels 24 when the driver selects 4×4 operation of the vehicle 20.

The dual-clutch transmission 100 and the dual-clutch 202 implemented in accordance with some non-limiting implementations of the present technology can be represented as presented in the following numbered clauses.

CLAUSE 1: A dual-clutch transmission (100) for use in a vehicle (20) having an internal combustion engine (52) and a driveline (54), the internal combustion engine having a crankshaft (53), the dual-clutch transmission comprising: a housing (102); a clutch pack drum (220) adapted to rotate inside the housing; a central clutch gear (200) connected to the clutch pack drum and being operatively connected to the crankshaft of the internal combustion engine, the central clutch gear defining a clutch gear plane (214) and a clutch gear rotation axis (216) normal to the clutch gear plane; a first clutch pack (240a) received in the clutch pack drum on a first side of the central clutch gear, the first clutch pack including: at least one first clutch plate (242) engaging and rotating with the clutch pack drum; and at least one first clutch disk (250) selectively engaged by the at least one first clutch plate, the at least one first clutch plate and the at least one first clutch disk being disposed alternatingly in a direction (246) defined by the clutch gear rotation axis; a first clutch hub (260a) received in the first clutch pack, the first clutch hub engaging and rotating with the at least one first clutch disk; a first pressure plate (320a) disposed on the first side of the central clutch gear, the first pressure plate rotating with the central clutch gear, the first pressure plate selectively squeezing the at least one first clutch plate and the at least one first clutch disk together for engaging the at least one first clutch disk with the at least one first clutch plate; a first shaft (400a) connected to the first clutch hub; at least one first transmission gear (600) operatively connected to the first shaft, the first shaft driving the at least one first transmission gear in response to the first pressure plate being moved axially to squeeze the at least one first clutch plate and the at least one first clutch disk together; a second clutch pack (240b) received in the clutch pack drum on a second side of the central clutch gear, the second clutch pack including: at least one second clutch plate (242) engaging and rotating with the clutch pack drum; and at least one second clutch disk (250) selectively engaged by the at least one second clutch plate, the at least one second clutch plate and the at least one second clutch disk being disposed alternatingly in the direction defined by the clutch gear rotation axis; a second clutch hub (260b) received in the second clutch pack, the second clutch hub engaging and rotating with the at least one second clutch disk; a second pressure plate (320b) disposed on the second side of the central clutch gear, the second pressure plate rotating with the central clutch gear, the second pressure plate selectively squeezing the at least one second clutch plate and the at least one second clutch disk together for engaging the at least one second clutch disk with the at least one second clutch plate; a second shaft (400b) connected to the second clutch hub; and at least one second transmission gear (600) operatively connected to the second shaft, the second shaft driving the at least one second transmission gear in response to the second pressure plate being moved axially to squeeze the at least one second clutch plate and the at least one second clutch disk together.

CLAUSE 2: The dual-clutch transmission of clause 1, wherein the first pressure plate is symmetrical to the second pressure plate about the clutch gear plane.

CLAUSE 3: The dual-clutch transmission of clause 1, wherein the first pressure plate is identical to the second pressure plate.

CLAUSE 4: The dual-clutch transmission of any one of clauses 1 to 3, further comprising an input damper (120) operatively connected to the central clutch gear, the input damper being configured for operative connection to the crankshaft.

CLAUSE 5: The dual-clutch transmission of clause 4, wherein the input damper is located outside the clutch pack drum.

CLAUSE 6: The dual-clutch transmission of clause 4 or 5, wherein the input damper comprises: a hollow shaft (122) defining splines (124) adapted for connection to the crankshaft, the hollow shaft having first and second ends (126, 128); an input member (140) slidably engaged to the hollow shaft and positioned between the first and second ends, the input member defining at least one recess (142); a disc spring assembly (150) connected to the hollow shaft and biasing the input member towards the second end; an output member (160) disposed over the hollow shaft and positioned between the input member and the second end of the hollow shaft, the output member defining at least one cam (166) structured and configured for engaging the at least one recess of the input member; and an output gear (170) connected to the output member, the output gear engaging and driving the central clutch gear.

CLAUSE 7: The dual-clutch transmission of clause 6, further comprising a pump gear (180) operatively connected to the output member of the input damper, the pump gear being adapted to drive a transmission fluid pump (104).

CLAUSE 8: The dual-clutch transmission of any one of clauses 1 to 7, wherein the first shaft defines: a first passage (410) adapted for supplying fluid to a first chamber (350a) defined between the central clutch gear and the first pressure plate, and a second passage (412) adapted for supplying fluid to a second chamber (350b) defined between the central clutch gear and the second pressure plate.

CLAUSE 9: The dual-clutch transmission of clause 8, wherein the first shaft further defines a third passage (414) adapted for selectively supplying fluid to the clutch pack drum.

CLAUSE 10: The dual-clutch transmission of clause 9, wherein the first clutch hub has a plurality of bores (280) defined therein adapted for supplying fluid from the third passage of the first shaft to the clutch pack drum.

CLAUSE 11: The dual-clutch transmission of any one of clauses 8 to 10, wherein each of the first and second pressure plates has a pressure plate passage (360a, 360b) defined therein for supplying fluid from the first shaft to the clutch pack drum.

CLAUSE 12: The dual-clutch transmission of any one of clauses 8 to 11, wherein the first and second pressure plates have a plurality of pads (344) projecting therefrom and being configured to abut the central clutch gear, the pads being structured for selectively allowing flow of fluid from each of the first and second passages of the first shaft to the corresponding first and second chambers.

CLAUSE 13: The dual-clutch transmission of any one of clauses 1 to 12, wherein the clutch pack drum includes a first clutch pack basket (222a) disposed on the first side of the central clutch gear, and a second clutch pack basket (222b) disposed on the second side of the central clutch gear, the first clutch pack basket being symmetrical to the second clutch pack basket about the clutch gear plane.

CLAUSE 14: The dual-clutch transmission of any one of clauses 1 to 12, wherein the clutch pack drum includes a first clutch pack basket (222a) disposed on the first side of the central clutch gear, and a second clutch pack basket (222b) disposed on the second side of the central clutch gear, the first clutch pack basket being identical to the second clutch pack basket.

CLAUSE 15: The dual-clutch transmission of any one of clause 1 to 14, further comprising a subtransmission (700) having an input shaft (702) being configured for operative connection to the first and second shafts, and an output shaft (740) being configured for operative connection to the driveline of the vehicle, the subtransmission having a high gear configuration and a low gear configuration; when the subtransmission is in the high gear configuration, a first gear ratio is defined between the input shaft and the output shaft; and when the subtransmission is in the low gear configuration, a second gear ratio is defined between the input shaft and the output shaft, the first gear ratio being smaller than the second gear ratio.

CLAUSE 16: The dual-clutch transmission of clause 15, wherein the subtransmission further comprises: an input gear (704), and an output damper (710) operatively connected between the input gear and the input shaft of the subtransmission.

CLAUSE 17: The dual-clutch transmission of any one of clauses 1 to 16, wherein the second shaft is hollow and the first shaft extends through the second shaft.

CLAUSE 18: The dual-clutch transmission of clause 17, wherein: the second shaft is operatively connected to the at least one second transmission gear on the second side of the central clutch gear; and the first shaft is operatively connected to the at least one first transmission gear on the second side of the central clutch gear.

CLAUSE 19: A vehicle (20) comprising: a frame (22); an engine (52) connected to the frame; the dual-clutch transmission (100) of any one of clauses 1 to 18 operatively connected to the engine; and a driveline (54) operatively connected to the dual-clutch transmission.

CLAUSE 20: A dual-clutch (202) comprising: a clutch pack drum (220); a central clutch gear (200) connected to the clutch pack drum and being adapted for operative connection to a crankshaft (53), the central clutch gear defining a clutch gear plane (214) and a clutch gear rotation axis (216) normal to the clutch gear plane; a first clutch pack (240a) received in the clutch pack drum on a first side of the central clutch gear, the first clutch pack including: at least one first clutch plate (242) engaging and rotating with the clutch pack drum; and at least one first clutch disk (250) selectively engaged by the at least one first clutch plate, the at least one first clutch plate and the at least one first clutch disk being disposed alternatingly in a direction (246) defined by the clutch gear axis; a first clutch hub (260a) received in the first clutch pack, the first clutch hub engaging and rotating with the at least one first clutch disk, and being configured for operative connection to a first shaft (400a); a first pressure plate (320a) disposed on the first side of the central clutch gear, the first pressure plate rotating with the central clutch gear, the first pressure plate selectively squeezing the at least one first clutch plate and the at least one first clutch disk together for engaging the at least one first clutch disk with the at least one first clutch plate; a second clutch pack (240b) received in the clutch pack drum on a second side of the central clutch gear, the second clutch pack including: at least one second clutch plate (242) engaging and rotating with the clutch pack drum; and at least one second clutch disk (250) selectively engaged by the at least one second clutch plate, the at least one second clutch plate and the at least one second clutch disk being disposed alternatingly in the direction defined by the clutch gear axis; a second clutch hub (260b) received in the second clutch pack, the second clutch hub engaging and rotating with the at least one second clutch disk, and being configured for operative connection to a second shaft (400b); and a second pressure plate (320b) disposed on the second side of the central clutch gear, the second pressure plate rotating with the central clutch gear, the second pressure plate selectively squeezing the at least one second clutch plate and the at least one second clutch disk together for engaging the at least one second clutch disk with the at least one second clutch plate.

CLAUSE 21: The dual-clutch of clause 20, wherein the first pressure plate is symmetrical to the second pressure plate about the clutch gear plane.

CLAUSE 22: The dual-clutch of clause 20, wherein the first pressure plate is identical to the second pressure plate.

CLAUSE 23: The dual-clutch of any one of clauses 20 to 22, wherein the first clutch hub has a plurality of bores (280) defined therein adapted for supplying fluid to the clutch pack drum.

CLAUSE 24: The dual-clutch of any one of clauses 20 to 23, wherein each of the first and second pressure plates has a pressure plate passage (360a, 360b) defined therein for supplying fluid to the clutch pack drum.

CLAUSE 25: The dual-clutch of any one of clauses 20 to 24, wherein the first and second pressure plates have a plurality of pads (344) projecting therefrom and being configured to abut the central clutch gear, the pads being structured for selectively allowing flow of fluid to the corresponding first and second chambers.

CLAUSE 26: The dual-clutch of any one of clauses 20 to 25, wherein the clutch pack drum includes a first clutch pack basket (222a) disposed on the first side of the central clutch gear, and a second clutch pack basket (222b) disposed on the second side of the central clutch gear, the first clutch pack basket being symmetrical to the second clutch pack basket about the clutch gear plane.

CLAUSE 27: The dual-clutch of any one of clauses 20 to 25, wherein the clutch pack drum includes a first clutch pack basket (222a) disposed on the first side of the central clutch gear, and a second clutch pack basket (222b) disposed on the second side of the central clutch gear, the first clutch pack basket being identical to the second clutch pack basket.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A dual-clutch transmission for use in a vehicle having an internal combustion engine and a driveline, the internal combustion engine having a crankshaft, the dual-clutch transmission comprising:
   a housing;
   a clutch pack drum adapted to rotate inside the housing;
   an input damper configured to be operatively connected to the crankshaft, the input damper being located outside the clutch pack drum;
   a central clutch gear connected to the clutch pack drum, the central clutch gear being driven by the input damper via a plurality of teeth of the central clutch gear such that the input damper is configured to operatively connect the central clutch gear to the crankshaft, the central clutch gear defining a clutch gear plane and a clutch gear rotation axis normal to the clutch gear plane;
   a first clutch pack received in the clutch pack drum on a first side of the central clutch gear, the first clutch pack including:
      at least one first clutch plate engaging and rotating with the clutch pack drum; and
      at least one first clutch disk selectively engaged by the at least one first clutch plate, the at least one first clutch plate and the at least one first clutch disk being disposed alternatingly in a direction defined by the clutch gear rotation axis;
   a first clutch hub received in the first clutch pack, the first clutch hub engaging and rotating with the at least one first clutch disk;
   a first pressure plate disposed on the first side of the central clutch gear, the first pressure plate rotating with the central clutch gear, the first pressure plate selectively squeezing the at least one first clutch plate and the at least one first clutch disk together for engaging the at least one first clutch disk with the at least one first clutch plate;

a first shaft connected to the first clutch hub, the first shaft being rotatable about the clutch gear rotation axis;
at least one first transmission gear operatively connected to the first shaft such that the at least one first transmission gear is rotatable about the clutch gear rotation axis, the first shaft driving the at least one first transmission gear in response to the first pressure plate being moved axially to squeeze the at least one first clutch plate and the at least one first clutch disk together;
a second clutch pack received in the clutch pack drum on a second side of the central clutch gear, the second side of the central clutch gear being opposite the first side of the central clutch gear, the second clutch pack including:
 at least one second clutch plate engaging and rotating with the clutch pack drum; and
 at least one second clutch disk selectively engaged by the at least one second clutch plate, the at least one second clutch plate and the at least one second clutch disk being disposed alternatingly in the direction defined by the clutch gear rotation axis;
a second clutch hub received in the second clutch pack, the second clutch hub engaging and rotating with the at least one second clutch disk;
a second pressure plate disposed on the second side of the central clutch gear, the second pressure plate rotating with the central clutch gear, the second pressure plate selectively squeezing the at least one second clutch plate and the at least one second clutch disk together for engaging the at least one second clutch disk with the at least one second clutch plate;
a second shaft connected to the second clutch hub, the second shaft being coaxial with the first shaft such that the second shaft is rotatable about the clutch gear rotation axis;
at least one second transmission gear operatively connected to the second shaft such that the at least one second transmission gear is rotatable about the clutch gear rotation axis, the second shaft driving the at least one second transmission gear in response to the second pressure plate being moved axially to squeeze the at least one second clutch plate and the at least one second clutch disk together; and
an output shaft configured for operative connection to the driveline of the vehicle, the output shaft being operatively connected to and driven by:
 the at least one first transmission gear in response to the first pressure plate being moved axially to squeeze the at least one first clutch plate and the at least one first clutch disk together; and
 the at least one second transmission gear in response to the second pressure plate being moved axially to squeeze the at least one second clutch plate and the at least one second clutch disk together.

2. The dual-clutch transmission of claim 1, wherein the first pressure plate is symmetrical to the second pressure plate about the clutch gear plane.

3. The dual-clutch transmission of claim 1, wherein the first pressure plate is identical to the second pressure plate.

4. The dual-clutch transmission of claim 1, wherein the input damper comprises:
a hollow shaft defining splines adapted for connection to the crankshaft, the hollow shaft having first and second ends;
an input member slidably engaged to the hollow shaft and positioned between the first and second ends, the input member defining at least one recess;
a disc spring assembly connected to the hollow shaft and biasing the input member towards the second end;
an output member disposed over the hollow shaft and positioned between the input member and the second end of the hollow shaft, the output member defining at least one cam structured and configured for engaging the at least one recess of the input member; and
an output gear connected to the output member, the output gear engaging and driving the central clutch gear.

5. The dual-clutch transmission of claim 4, further comprising a pump gear operatively connected to the output member of the input damper, the pump gear being adapted to drive a transmission fluid pump.

6. The dual-clutch transmission of claim 1, wherein the first shaft defines:
a first passage adapted for supplying fluid to a first chamber defined between the central clutch gear and the first pressure plate, and
a second passage adapted for supplying fluid to a second chamber defined between the central clutch gear and the second pressure plate.

7. The dual-clutch transmission of claim 6, wherein the first shaft further defines a third passage adapted for selectively supplying fluid to the clutch pack drum.

8. The dual-clutch transmission of claim 7, wherein the first clutch hub has a plurality of bores defined therein adapted for supplying fluid from the third passage of the first shaft to the clutch pack drum.

9. The dual-clutch transmission of claim 6, wherein each of the first and second pressure plates has a pressure plate passage defined therein for supplying fluid from the first shaft to the clutch pack drum.

10. The dual-clutch transmission of claim 6, wherein the first and second pressure plates have a plurality of pads projecting therefrom and being configured to abut the central clutch gear, the pads being structured for selectively allowing flow of fluid from each of the first and second passages of the first shaft to the corresponding first and second chambers.

11. The dual-clutch transmission of claim 1, wherein:
the clutch pack drum includes a first clutch pack basket disposed on the first side of the central clutch gear, and a second clutch pack basket disposed on the second side of the central clutch gear;
the first clutch pack is received in the first clutch pack basket;
the second clutch pack is received in the second clutch pack basket; and
the first clutch pack basket is symmetrical to the second clutch pack basket about the clutch gear plane.

12. The dual-clutch transmission of claim 1, wherein:
the clutch pack drum includes a first clutch pack basket disposed on the first side of the central clutch gear, and a second clutch pack basket disposed on the second side of the central clutch gear;
the first clutch pack is received in the first clutch pack basket;
the second clutch pack is received in the second clutch pack basket; and
the first clutch pack basket is identical to the second clutch pack basket.

13. The dual-clutch transmission of claim 1, further comprising a subtransmission having an input shaft being configured for operative connection to the first and second shafts, and the output shaft configured for operative connection to the driveline of the vehicle, the subtransmission having a high gear configuration and a low gear configuration;
  when the subtransmission is in the high gear configuration, a first gear ratio is defined between the input shaft and the output shaft; and
  when the subtransmission is in the low gear configuration, a second gear ratio is defined between the input shaft and the output shaft, the first gear ratio being smaller than the second gear ratio.

14. The dual-clutch transmission of claim 13, wherein the subtransmission further comprises:
  an input gear, and
  an output damper operatively connected between the input gear and the input shaft of the subtransmission.

15. The dual-clutch transmission of claim 1, wherein the second shaft is hollow and the first shaft extends through the second shaft.

16. The dual-clutch transmission of claim 15, wherein:
  the second shaft is operatively connected to the at least one second transmission gear on the second side of the central clutch gear; and
  the first shaft is operatively connected to the at least one first transmission gear on the second side of the central clutch gear.

17. A vehicle comprising:
  a frame;
  an engine connected to the frame;
  the dual-clutch transmission of claim 1 operatively connected to the engine; and
  a driveline operatively connected to the dual-clutch transmission.

18. A dual-clutch comprising:
  a clutch pack drum;
  a central clutch gear connected to the clutch pack drum and being configured to be operatively connected to a crankshaft, the central clutch gear defining a clutch gear plane and a clutch gear rotation axis normal to the clutch gear plane;
  a first clutch pack received in the clutch pack drum on a first side of the central clutch gear, the first clutch pack including:
    at least one first clutch plate engaging and rotating with the clutch pack drum; and
    at least one first clutch disk selectively engaged by the at least one first clutch plate, the at least one first clutch plate and the at least one first clutch disk being disposed alternatingly in a direction defined by the clutch gear axis;
  a first clutch hub received in the first clutch pack, the first clutch hub engaging and rotating with the at least one first clutch disk, and being configured to be mounted to and drive a first shaft, the first clutch hub comprising a central portion having an inner surface configured to be in contact with the first shaft, the central portion defining a plurality of bores adapted for supplying fluid to the clutch pack drum, the bores extending from the inner surface of the central portion;
  a first pressure plate disposed on the first side of the central clutch gear, the first pressure plate rotating with the central clutch gear, the first pressure plate selectively squeezing the at least one first clutch plate and the at least one first clutch disk together for engaging the at least one first clutch disk with the at least one first clutch plate;
  a second clutch pack received in the clutch pack drum on a second side of the central clutch gear, the second side of the central clutch gear being opposite the first side of the central clutch gear, the second clutch pack including:
    at least one second clutch plate engaging and rotating with the clutch pack drum; and
    at least one second clutch disk selectively engaged by the at least one second clutch plate, the at least one second clutch plate and the at least one second clutch disk being disposed alternatingly in the direction defined by the clutch gear axis;
  a second clutch hub received in the second clutch pack, the second clutch hub engaging and rotating with the at least one second clutch disk, and being configured to be mounted to and drive a second shaft; and
  a second pressure plate disposed on the second side of the central clutch gear, the second pressure plate rotating with the central clutch gear, the second pressure plate selectively squeezing the at least one second clutch plate and the at least one second clutch disk together for engaging the at least one second clutch disk with the at least one second clutch plate,
  each of the first and second pressure plates having a pressure plate passage defined therein for supplying fluid to the clutch pack drum.

19. The dual-clutch of claim 18, wherein the first pressure plate is symmetrical to the second pressure plate about the clutch gear plane.

20. The dual-clutch of claim 18, wherein the first pressure plate is identical to the second pressure plate.

21. The dual-clutch of claim 18, wherein the first and second pressure plates have a plurality of pads projecting therefrom and being configured to abut the central clutch gear, the pads being structured for selectively allowing flow of fluid to the corresponding first and second chambers.

22. The dual-clutch of claim 18, wherein:
  the clutch pack drum includes a first clutch pack basket disposed on the first side of the central clutch gear, and a second clutch pack basket disposed on the second side of the central clutch gear;
  the first clutch pack is received in the first clutch pack basket;
  the second clutch pack is received in the second clutch pack basket; and
  the first clutch pack basket is symmetrical to the second clutch pack basket about the clutch gear plane.

23. The dual-clutch of claim 18, wherein:
  the clutch pack drum includes a first clutch pack basket disposed on the first side of the central clutch gear, and a second clutch pack basket disposed on the second side of the central clutch gear;
  the first clutch pack is received in the first clutch pack basket;
  the second clutch pack is received in the second clutch pack basket; and
  the first clutch pack basket being identical to the second clutch pack basket.

* * * * *